(12) United States Patent
Hata et al.

(10) Patent No.: US 7,319,493 B2
(45) Date of Patent: Jan. 15, 2008

(54) APPARATUS AND PROGRAM FOR SETTING VIDEO PROCESSING PARAMETERS

(75) Inventors: Toshiyuki Hata, Hamamatsu (JP); Hiroyuki Iwase, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 693 days.

(21) Appl. No.: 10/805,572

(22) Filed: Mar. 19, 2004

(65) Prior Publication Data

US 2004/0189878 A1   Sep. 30, 2004

(30) Foreign Application Priority Data

| Mar. 25, 2003 | (JP) | ............................. 2003-082171 |
| Mar. 25, 2003 | (JP) | ............................. 2003-082172 |
| Mar. 25, 2003 | (JP) | ............................. 2003-082173 |

(51) Int. Cl.
  H04N 5/222   (2006.01)
  H04N 9/74    (2006.01)

(52) U.S. Cl. ....................... 348/584; 348/722; 348/586; 348/594; 348/595; 715/723; 386/52; 386/53

(58) Field of Classification Search ................. 348/584, 348/722, 593–595, 705, 578, 588–589; 715/723–726; 382/52, 53

See application file for complete search history.

(56) References Cited

U.S. PATENT DOCUMENTS

| 5,262,865 | A  | * | 11/1993 | Herz | ........................... 348/705 |
| 5,852,438 | A  | * | 12/1998 | Tomizawa et al. | .......... 715/738 |
| 6,452,612 | B1 | * | 9/2002  | Holtz et al. | ................. 715/723 |
| 7,020,381 | B1 | * | 3/2006  | Kato et al. | ..................... 386/52 |
| 2002/0118302 | A1 | | 8/2002 | Iizuka et al. | |

OTHER PUBLICATIONS

U.S. Appl. No. 10/664,777, Multi-Channel Video Mixer for Applying Visual Effects to Video Signals.

* cited by examiner

*Primary Examiner*—M. Lee
(74) *Attorney, Agent, or Firm*—Morrison & Foerster LLP

(57) ABSTRACT

A video signal processing apparatus 1 and a video processing parameter setting apparatus 2 comprise a video processing apparatus (visual mixer). A parameter value collectively specifying portion 3 specifies in accordance with the order stored in an arpeggiator pattern memory 7, sets of scene data which collectively specify values of a plurality of parameters stored in a scene data memory 6. A changing process portion 4 changes in a given length of time, the values of video processing parameters from the values currently set on the video signal processing apparatus 1 to the parameter values collectively specified as a set of scene data. The changing process is started at a timing corresponding to a change time and completed at a subsequent switch timing. As a result, the video processing apparatus allows for collective specification of parameters with simple operations and smooth switching between video images at the changing of parameter values.

30 Claims, 15 Drawing Sheets

FIG.4
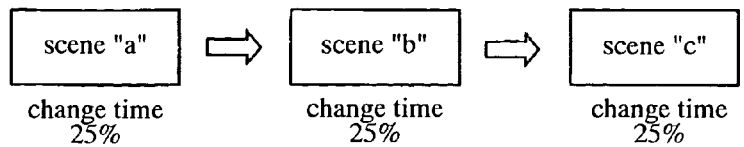
(a) arpeggiator pattern
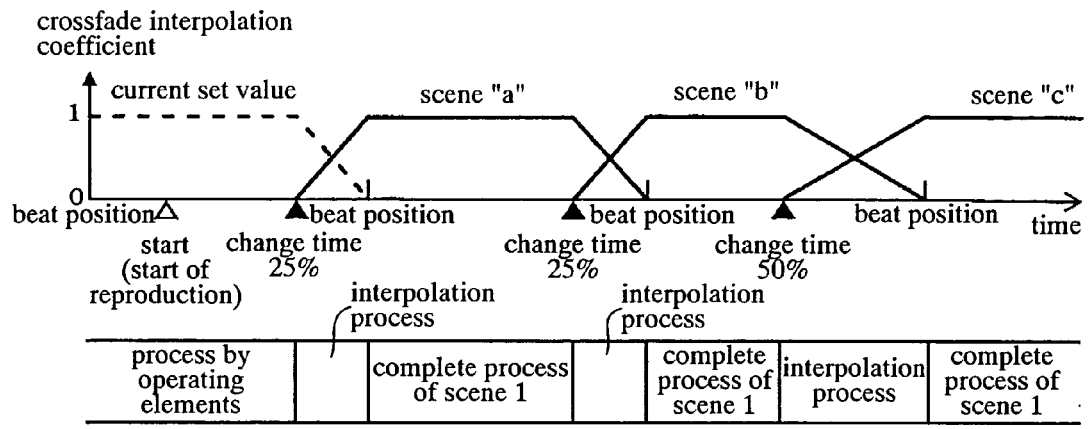
(b) changing process of scene data
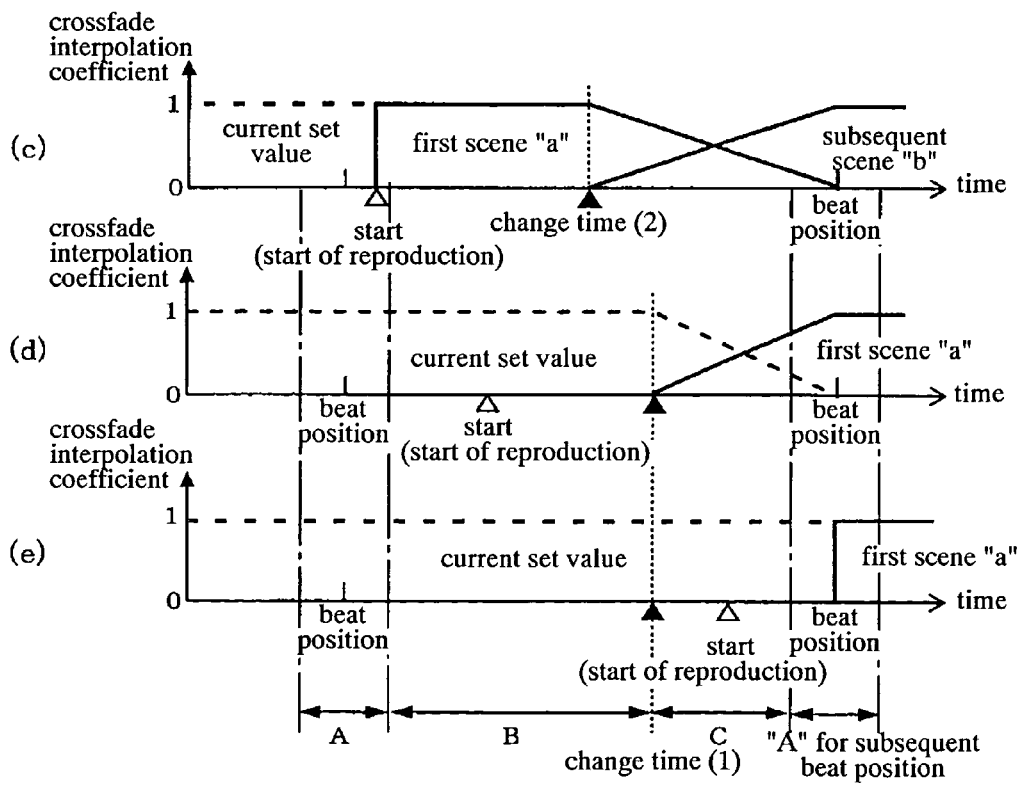
(c)~(e) changing process of scene data at initiation of arpeggiator reproduction

FIG.7 scene switch 1 ······ scene data 1
scene switch 2 ······ scene data 1
scene switch 3 ······ scene data 1
scene switch 4 ······ scene data 1
scene switch 5 ······ scene data 1
scene switch 6 ······ scene data 1

(a) scene data memory

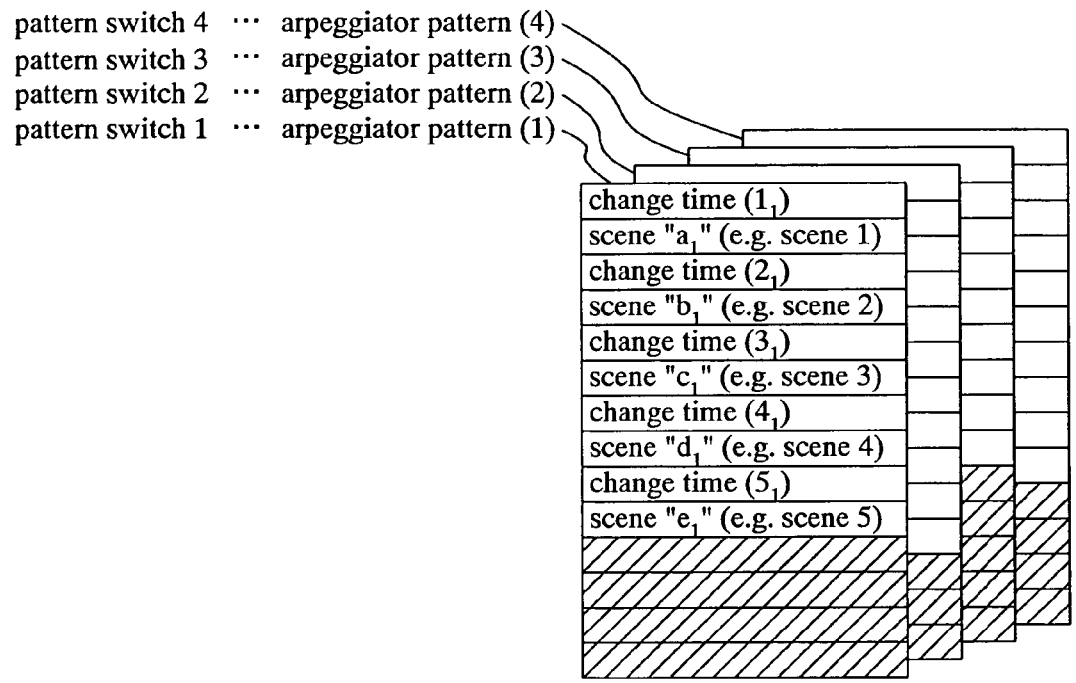

pattern switch 4 ··· arpeggiator pattern (4)
pattern switch 3 ··· arpeggiator pattern (3)
pattern switch 2 ··· arpeggiator pattern (2)
pattern switch 1 ··· arpeggiator pattern (1)

change time $(1_1)$
scene "$a_1$" (e.g. scene 1)
change time $(2_1)$
scene "$b_1$" (e.g. scene 2)
change time $(3_1)$
scene "$c_1$" (e.g. scene 3)
change time $(4_1)$
scene "$d_1$" (e.g. scene 4)
change time $(5_1)$
scene "$e_1$" (e.g. scene 5)

(b) arpeggiator pattern memory

FIG.8

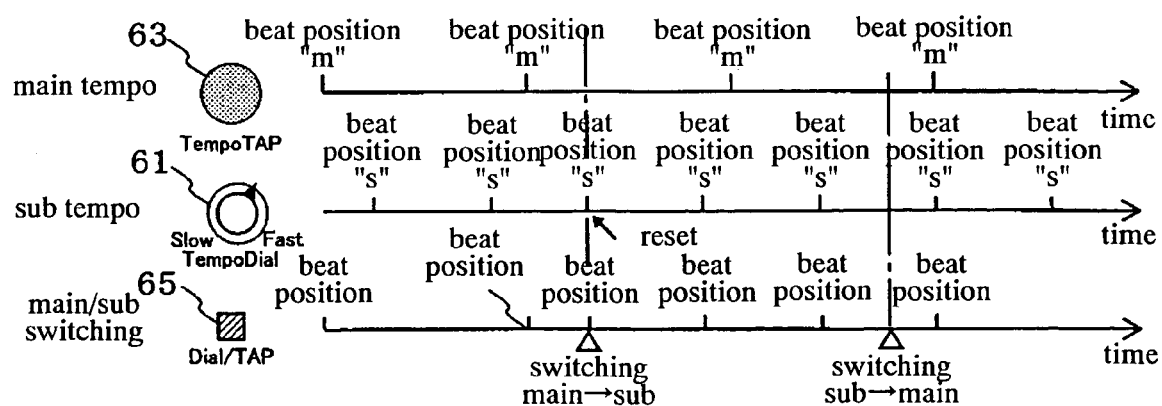

APPARATUS AND PROGRAM FOR SETTING VIDEO PROCESSING PARAMETERS

BACKGROUND OF THE INVENTION

1. Field of the Invention

The present invention relates to an apparatus and program for setting video processing parameters, and more particularly to a visual mixer (video mixer) for inputting video signals from one or more channels for video processing.

2. Description of the Related Art

At a music event or the like, a visual mixer has been well-known which has a capability of synthesizing various video signals or switching various video signals such as video signals obtained by shooting a live performance on a stage, video signals reproduced by a videotape recorder or video signals output from a personal computer in order to project thus-processed video pictures onto a screen situated behind the stage. By using such a visual mixer, a video operator known as a VJ (Visual Jockey) sets parameters for video processing in accordance with an actual performance in order to select or switch input channels or add a visual effect to video signals transmitted from each input channel or combined video signals.

On conventional visual mixers, major operations done by the video operator had been fading and switching of video signals transmitted from two input channels or adding a visual effect to video signals transmitted from each input channel, however, as disclosed in Japanese Laid-Open No. 2002-262179, there has been put forth a visual mixer having a capability of storing and reproducing scene data. The visual mixer is capable of storing, in a storage device as a set of scene data (real-time scene data), settings of video processing parameters set through a plurality of operating elements provided on an operating panel. According to the visual mixer, by an operation for reproducing the stored scene data, the values of video processing parameters set through the operating elements on the operating panel can be reproduced regardless of the number of channels. The visual mixer is different from videotape recorders in that the visual mixer does not store and reproduce video signals themselves but reproduces video processing parameters to switch or synthesize input video signals or add a visual effect to input video signals.

The capability of reproducing scene data enables the video operator to change the settings of video processing parameters with a one-touch operation, allowing semi-automated operation to be achieved with real time property even if the number of input channels in use is increased. At a music event or the like, as a result, the video operator can intuitively mix live pictures from multi-channels in real-time as much as possible in order to achieve exciting mixing operations. However, there are occasions in which the video operator desires to consecutively change the values of video processing parameters in order to avoid monotonous and boring visual variations. In such occasions, the video operator is required to switch scene switches consecutively. Moreover, there are occasions in which the video operator desires to change video processing parameters in accordance with the time progression in a video stream, musical performance or the like. In such occasions, the video operator is required to switch scene data in accordance with the time progression. In those occasions, it is quite difficult for ordinary users to make output pictures switching in suitable timing.

SUMMARY OF THE INVENTION

The present invention was accomplished to solve the above-described problem, and an object thereof is to provide an apparatus and a program for setting video processing parameters, the apparatus and program allowing for collective specification of parameters with simple operations and providing smooth switching between video images at the changing of parameter values.

Further, the object of the present invention is to provide an apparatus and a program for setting video processing parameters, the apparatus and program allowing for collective specification of parameters with simple operations and being capable of processing video images in accordance with periodically output switch timing signal.

In addition, the object of the present invention is to provide an apparatus and a program for setting video processing parameters, the apparatus and program allowing for collective specification of parameters with simple operations and being capable of automatically switching the video processing as intended by an operator.

In order to achieve the above-described object, a feature of the present invention lies in a video processing parameter setting apparatus for setting values of a plurality of parameters on a video signal processing apparatus, the video processing parameter setting apparatus comprising a parameter value collectively specifying portion and a changing process portion for changing in a given length of time, the values of the parameters set on the video signal processing apparatus from currently set values into the values of the parameters collectively specified by the parameter value collectively specifying portion.

The above-described feature produces effects of allowing for collective specification of complicated parameters with simple operations by an operator and providing smooth switching between video images at the changing of parameter values. As a result, the above-described feature facilitates the operator's operations, allowing for various video processing with a wide variety of changing processes. In addition, the feature allows ordinary users to operate as a video operator, lightening the operator's workload in making interesting and unwearying video images.

The above-described parameter value collectively specifying portion, which is capable of specifying sets of scene data, can be configured to specify from among the sets of scene data, a set of scene data one after the other, enabling the operator to switch the video processing in sequence as intended.

The above-described parameter values may be adapted to be those for specifying at least the size and/or layout of a video image of one or more channels.

Further, the above-described video processing parameter setting apparatus may also be adapted to have a switch timing outputting portion for periodically outputting a switch timing signal, wherein the changing process portion specifies a timing of starting changing in between adjacent switch timing signals and completes changing processing at a switch timing subsequent to the timing at which the changing processing is started.

In this case, the above video processing parameter setting apparatus realizes video processing in accordance with the periodic switch timing, facilitating the operator's operations to achieve video processing in synchronization with the switching of music and video images. In addition, the operator is allowed to arbitrarily establish a cycle period of the switch timing or adopt a predetermined cycle period of the switch timing.

A further feature of the present invention lies in a video processing parameter setting apparatus for setting values of a plurality of parameters on a video signal processing apparatus which inputs a video signal, processes the video signal in accordance with the values of the parameters, and outputs the processed video signal, the video processing parameter setting apparatus comprising a parameter value collectively specifying portion for collectively specifying values of the plurality of parameters as scene data; a switch timing outputting portion for periodically outputting a switch timing signal; and a changing process portion for specifying a timing of starting changing in between adjacent switch timing signals output by the switch timing outputting portion, wherein in a first case where a timing at which the parameter value collectively specifying portion collectively specifies the values of the parameters precedes the timing of starting changing, the changing process portion changes in a given length of time, values of the parameters set on the video signal processing apparatus from parameter values currently set at the timing of starting changing to parameter values collectively specified by the parameter value collectively specifying portion, and finishes changing at a subsequent switch timing; and in a second case where the timing at which the parameter value collectively specifying portion collectively specifies the parameter values follows the timing of starting changing and precedes a subsequent switch timing, the changing process portion changes at the subsequent switch timing, the parameter values set on the video signal processing apparatus into the parameter values collectively specified by the parameter value collectively specifying portion.

The above feature allows for appropriate parameter changing processing in accordance with the correspondence between the timing at which the parameter value collectively specifying portion specifies parameters, and the switching timing and the timing at which the changing processing is started.

The above video processing parameter setting apparatus is also capable of putting back in a given length of time, the parameter values which have been collectively specified, to the parameter values which had been set on the video signal processing apparatus prior to the collective specification.

In this case, the video processing parameter setting apparatus may be adapted such that the changing process portion changes at a switch timing determined by the switch timing signal output by the switch timing outputting portion, the parameter values set on the video signal processing apparatus into the parameter values collectively specified by the parameter values collectively specifying portion, and specifies a timing of starting changing in between the above switch timing and a subsequent switch timing determined by the switch timing signal output by the switch timing outputting portion, while changing in a given length of time, the parameter values set on the video signal processing apparatus from the parameter values set at the timing of starting changing into the parameter values which had been set on the video signal processing apparatus prior to the collective specification, to complete the changing processing at the subsequent switch timing. Such changing may be performed by, for example, a crossfade interpolation process.

In the above video processing parameter setting apparatus, the switch timing signal output by the switch timing outputting portion may have a given margin, wherein in a third case where a timing at which the parameter value collectively specifying portion collectively specifies the parameter values is placed in the marginal period, the changing process portion changes at the timing of collective specification, the parameter values set on the video signal processing apparatus into the parameter values collectively specified by the parameter value collectively specifying portion.

In this case, if the timing of collective specification is placed within the marginal period of the switch timing signal, in consideration of operator's inaccurate operation in instructing a timing of collective specification, the switch timing is regarded as the timing of collective specification. Due to the margin, the changing processing can be achieved in accordance with the operator's intended operations.

Still a further feature of the present invention lies in a video processing parameter setting apparatus for setting parameter values on a video signal processing apparatus, the video processing parameter setting apparatus comprising a parameter value collectively specifying portion, a switch timing outputting portion for periodically outputting a switch timing signal, and a changing process portion for changing at a switch timing determined by the switch timing signal, the parameter values set on the video signal processing apparatus into the collectively specified parameter values.

The above-described feature produces effects of allowing for collective specification of complicated parameters with simple operations by an operator and realizing video processing in accordance with the periodically output switch timing signal. As a result, the above-described feature facilitates the operator's operations, allowing for video processing in accordance with the time progression of music and video images. More specifically, the above feature facilitates the combination of musical performance and video images, resulting in dynamic video images in harmony with music. In addition, the feature allows ordinary users to operate as a video operator, lightening the operator's workload in making interesting and unwearying video images.

The above-described parameter value collectively specifying portion, which is capable of specifying sets of scene data, can be configured to specify from among the sets of scene data, a set of scene data one after the other, enabling the operator to switch the video processing in sequence as intended.

The above changing process portion can have a capability of changing in a given length of time, the parameter values set on the video signal processing apparatus from the values set at the timing of starting changing to the parameter values collectively specified by the parameter value collectively specifying portion. Such changing processing performed in a given length of time, such as the crossfade interpolation process enables the operator to smoothly change video processing with simple operations.

Further, the above-described parameter values may be adapted to be those for specifying at least the size and/or layout of a video image of one or more channels.

Another feature of the present invention lies in the above-described video processing parameter setting apparatus comprising a mode switching portion for switching between modes of switch timing, wherein the switch timing outputting portion is capable of outputting the switch timing signal in a plurality of modes whose cycle period can be specified individually, and outputs the switch timing signal in one of the modes selected by the mode switching portion. This feature enables the operator to change the switch timing for the collective specification of parameters according to the circumstances.

In the above-described video processing parameter setting apparatus, the switch timing outputting portion may be adapted to set the cycle period of the switch timing for the sub mode relative to the cycle period of the switch timing for the main mode. The above-described feature facilitates setting of the cycle period for the sub mode in a case where the operator desires to make a slight change to the cycle period of the main mode in order to obtain a desired cycle period of the sub mode.

In the above-described video processing parameter setting apparatus, furthermore, the switch timing outputting portion may be adapted to reset a phase of switch timing signal for the sub mode to output the switch timing signal for the sub mode in a case where the operator changes the switch timing from the main mode to sub mode. Particularly, when the operator desires to change from the cycle period of switch timing for the main mode to that of the sub mode, the above-described feature which allows for the immediate output of the switch timing signal for the sub mode causes instant specification of parameters by the parameter value collectively specifying portion, resulting in the operator's quick response to dynamically changing situations.

In a case where the switch timing outputting portion is changed from the switch timing for the sub mode to the switch timing for the main mode by the mode switching portion, the switch timing outputting portion may be adapted to output the switch timing signal of the main mode without resetting the phase of the main switch timing signal. As a result, when the switch timing is changed from the sub switch timing to the main switch timing to return to the steady state after the temporary output of the sub switch timing signal, the main switch timing signal can be output on the basis of the original phase.

The switch timing outputting portion can establish the cycle period of the switch timing on the basis of the time interval between at least two timings input through operations of an operating element.

In the above-described video processing parameter setting apparatus, the parameter value collectively specifying portion may have a first mode in which at the collective specification of the parameter values, the phase of the switch timing signal output by the switch timing outputting portion is reset to output the switch timing signal, and a second mode in which the phase of the switch timing signal is not reset. The phase of the switch timing signal can be controlled by specifying the mode. The operator selects the first mode or second mode in accordance with a case where it is preferable to maintain at the collective specification of the parameter values, the phase of the currently output switch timing signal or a case where it is preferable to immediately output the switch timing signal to immediately specify the parameter values at the collective specification of the parameter values. For example, the two modes can be distinguished such that the collective specification is immediately conducted in a case where the currently specified scene data is to be re-specified, while the phase is maintained to conduct the specification at the output of a subsequent switch timing signal when a different set of scene data is to be collectively specified. The operator may also arbitrarily make a distinction between the two modes without depending on the above-described distinction.

An additional feature of the present invention lies in a video processing parameter setting apparatus for setting parameter values on a video signal processing apparatus, the video processing parameter setting apparatus comprising a parameter value collectively specifying portion for collectively specifying values of the plurality of parameters as scene data, the parameter value collectively specifying portion being capable of specifying sets of the scene data and specifying in sequence, one set of the scene data from among the sets of the scene data; and a changing process portion for changing the parameter values set on the video signal processing apparatus into the parameter values contained in the sequentially specified scene data and collectively specified by the parameter value collectively specifying portion.

The above-described feature produces effects of allowing for collective specification of complicated parameters with simple operations by an operator and allowing for automatic switching of video processing in accordance with the operator's intention. As a result, the above-described feature facilitates the operator's operations, allowing for continuous video processing with a wide variety of changing processes. In addition, the feature allows ordinary users to operate as a video operator, lightening the operator's workload in making interesting and unwearying video images.

The above-described parameter value collectively specifying portion is capable of specifying a "given order" from among "given orders" by, for example, storing "given orders" in a storage portion. The parameter value collectively specifying portion then specifies a set of scene data included in the specified "given order" one after the other.

Furthermore, the above-described parameter value collectively specifying portion may return to the first set of scene data to specify the first set after specifying the last set of scene data included in the order. With this returning capability, even in a case where the number of scene data sets included in the order is few, the number can be increased to automatically perform the parameter changing processing for a long period of time.

In the video processing parameter setting apparatus including a switch timing outputting portion for outputting a switch timing signal, when the switch timing signal is output by the switch timing outputting portion, the above-described changing process portion changes the parameter values set on the video signal processing apparatus into the parameter values collectively specified as scene data one after the other by the parameter value collectively specifying portion and sets the changed values on the video signal processing apparatus.

The above-described switch timing outputting portion may periodically output the switch timing signal. Furthermore, the switch timing outputting portion can establish a given cycle period of the switch timing. The above changing process portion can have a capability of changing in a given length of time, the parameter values set on the video signal processing apparatus from the values currently set at the timing of starting changing into the parameter values collectively specified by the parameter value collectively specifying portion. Such changing processing performed in a given length of time, such as the crossfade interpolation process enables the operator to smoothly change video processing with simple operations.

Further, the above-described parameter values may be adapted to be those for specifying at least the size and/or layout of a video image of one or more channels.

In the above-described video processing parameter setting apparatus, the parameter value collectively specifying portion may have a storage portion containing areas to write and read the above-described orders, wherein when an additional order is to be stored in an area which has already stored an order, the storage portion may add the additional order to the stored order. In this case, the storage portion can create and write the additional order by use of the stored order.

In the above-described video processing parameter setting apparatus, moreover, the changing process portion changes in a given length of time, the parameter values set on the video signal processing apparatus from the currently set values into the parameter values collectively specified by the parameter value collectively specifying portion, while the parameter value collectively specifying portion may be adapted to have a storage portion for storing the above-described orders and timings of starting changing in associated relation with the orders. In this case, a changing process performed in a given length of time such as the crossfade interpolation process is automatically conducted at the collective specification.

An even further feature of the present invention lies in a video processing parameter setting apparatus for setting parameter values on a video signal processing apparatus, the video processing parameter setting apparatus comprising a parameter value collectively specifying portion for collectively specifying values of the plurality of parameters as scene data, the parameter value collectively specifying portion being capable of specifying sets of the scene data and specifying in sequence, one set of the scene data from among the sets of the scene data; a switch timing outputting portion for periodically outputting a switch timing signal; and a changing process portion for changing at a switch timing determined by the switch timing signal, the parameter values set on the video signal processing apparatus into the parameter values contained in the sequentially specified scene data and collectively specified by the parameter value collectively specifying portion, wherein in a state where the changing process portion has collectively specified values of the parameters specified by the parameter value collectively specifying portion as first scene data on the video signal processing apparatus, if the parameter value collectively specifying portion collectively specifies values of the parameters as the first scene data or second scene data which is different from the first scene data, the changing process portion immediately changes the parameter values set on the video signal processing apparatus into values of the parameters collectively specified as the first scene data or the second scene data different from the first scene data when the switch timing signal is output by the switch timing outputting portion.

Due to the above feature, operator's intentional re-operation for collective specification allows for the collective specification of parameter values as the first scene data or the second scene data different from the first scene data, which achieves, at the output of the switch timing signal, video processing as intended by the operator.

The above-described cases where the parameter value collectively specifying portion collectively specifies parameter values in a state in which the parameter value collectively specifying portion has already collectively specified parameter values include cases where (1) the same scene data set is to be reproduced by the re-operation of a reproduction switch which has triggered the collective specification of the parameter values (arpeggiator automatic reproduction), (2) the first scene data set contained in a currently set pattern is to be specified by the operation of a return switch, (3) the first scene data set contained in a pattern is to be specified by the re-operation of a switch for specifying a pattern which has already operated, (4) the first scene data contained in a different pattern is to be specified by the operation of a switch which is provided for specifying the different pattern from a pattern which has been already operated, and (5) a subsequent scene data set contained in a pattern is to be specified by the operation of a trigger switch.

A further feature of the present invention lies in a video processing parameter setting apparatus according to the above-described feature, wherein in a state where the changing process portion has collectively specified values of the parameters specified by the parameter value collectively specifying portion as first scene data on the video signal processing apparatus, if the parameter values collectively specifying portion collectively specifies values of the parameters as the first scene data or second scene data which is different from the first scene data, the parameter value collectively specifying portion causes the switch timing outputting portion to reset a phase of the switch timing signal to output the switch timing signal.

Due to the feature, operator's intentional re-operation for collective specification immediately causes the output of the switch timing signal, so that parameter values collectively specified as the first scene data or second scene data different from the first scene data are immediately specified, which achieves immediate switching of video processing as intended by the operator.

Included in cases as described above are cases where (1) the same scene data is to be reproduced by the re-operation of a reproduction switch, and (2) a subsequent scene data set contained in a pattern is to be specified by the operation of a trigger switch.

For example, a case where the reproduction switch for starting the collective specification of parameter values is operated again is applied as follows: A video processing parameter setting apparatus for setting values of a plurality of parameters on a video signal processing apparatus which inputa a video signal, processing the video signal in accordance with the parameter values and outpus the processed video signal, the video processing parameter setting apparatus comprising: a parameter value collectively specifying portion for collectively specifying values of the plurality of parameters as scene data, the parameter value collectively specifying portion being capable of specifying sets of the scene data and specifying in sequence by the operation of the reproduction switch, one set of the scene data from among the sets of the scene data; a switch timing outputting portion for periodically outputting a switch timing signal; and a changing process portion for changing at a switch timing determined by the switch timing signal output by the switch timing outputting portion, the parameter values set on the video signal processing apparatus into the parameter values contained in the sequentially specified scene data and collectively specified by the parameter value collectively specifying portion, wherein in a state where the changing process portion has collectively specified values of the parameters specified by the parameter value collectively specifying portion as first scene data on the video signal processing apparatus, if the parameter values collectively specifying portion collectively specifies by the re-operation of the reproduction switch, values of the parameters as the first scene data, the parameter value collectively specifying portion causes the switch timing outputting portion to reset a phase of the switch timing signal to output the switch timing signal, and the changing process portion immediately changes, at the output of the switch timing signal by the switch timing outputting portion, the parameter values set on the video signal processing apparatus into the parameter values collectively specified as the first scene data.

As a result, the video processing parameter setting apparatus can produce an effect of extending the period in which the first scene data which is currently being reproduced is utilized.

In the above case, which is not limited to the case of the re-operation of the reproduction switch, the changing process portion is adapted to change in a given length of time, the parameter values set on the video signal processing apparatus from the currently set values into the parameter values collectively specified by the parameter value collectively specifying portion. The changing process portion is also adapted to specify a timing of starting changing in between adjacent switch timing signals output by the switch timing outputting portion and complete the changing process at a switch timing subsequent to the start timing.

In this case, if the reproduction switch is operated again during the changing process, the video processing parameter setting apparatus can return to the beginning of the currently reproduced first scene data in order to produce a repetitive effect.

The reproduction switch is not supposed to be operated again after the collective specification of parameter values is started. As described above, therefore, reproducing of the scene data which is currently set on the video signal processing apparatus can be realized by the re-operation of the reproduction switch, which eliminates the need for providing an additional operating element. Further, since the above-described usage of the reproduction switch is close to its fundamental function of collectively specifying parameter values, users can easily understand the function performed by the re-operation of the reproduction switch.

The present invention may be configured and embodied not only as an invention of a device but also as an invention of a method and a computer program.

BRIEF DESCRIPTION OF THE DRAWINGS

FIG. 4 is a first diagram illustrating a process for changing scene data according to the functional configuration shown in FIG. 1;

FIG. 7 is a diagram showing the memory configuration illustrating scene data and arpeggiator patterns in the functional configuration shown in FIG. 1;

FIG. 8 is a diagram illustrating the function of a switch timing outputting portion 5 in the functional configuration shown in FIG. 1;

DESCRIPTION OF THE PREFERRED EMBODIMENT

Figure 1:
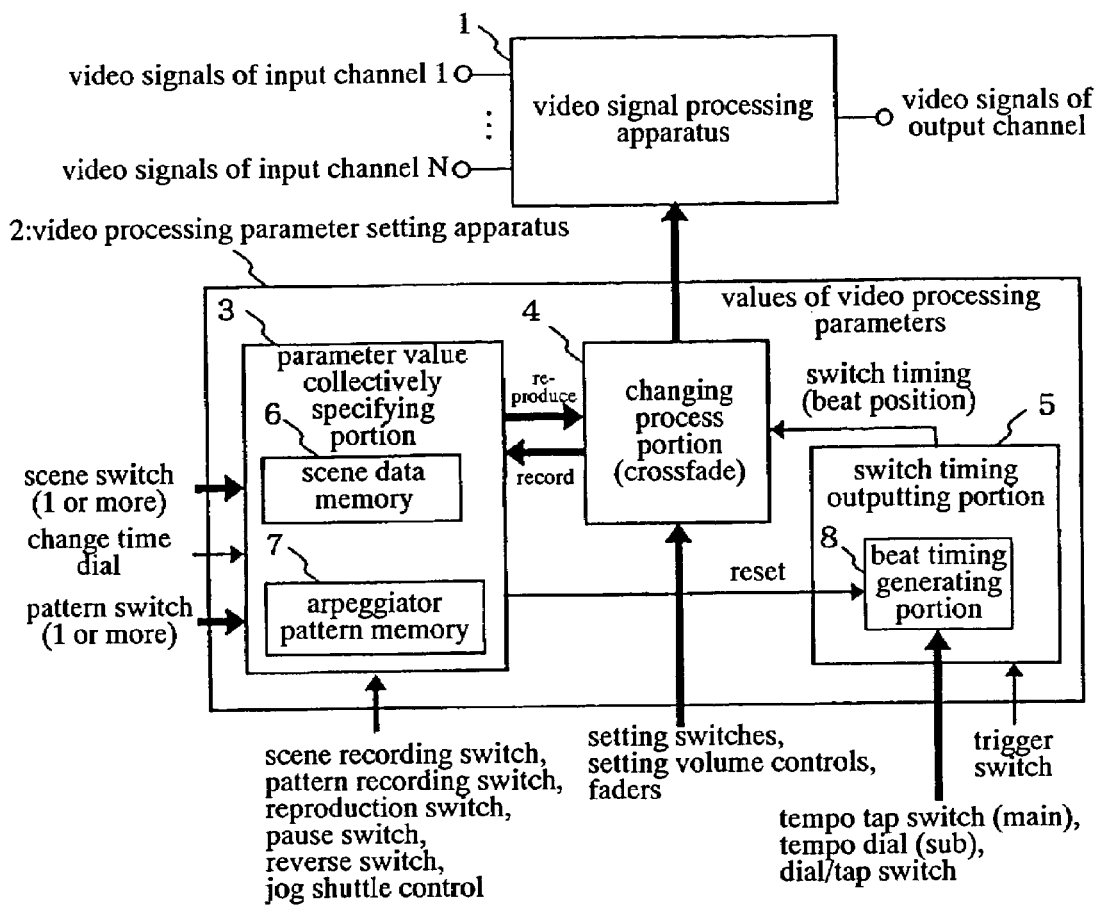
FIG. 1 is a functional configuration diagram illustrating an embodiment of a video processing parameter setting apparatus of the present invention.

FIG. 1 is a functional configuration diagram illustrating an embodiment of a video processing parameter setting apparatus of the present invention. In the figure, numeral 1 indicates a video signal processing apparatus, while numeral 2 indicates a video processing parameter setting apparatus. These apparatuses 1, 2 comprise a video processing apparatus, more specifically, a visual mixer. The video signal processing apparatus 1 inputs motion images and still images as video signals and processes the video signals to output the processed video signals to a video display apparatus. More specifically, the video signal processing apparatus 1 inputs video signals through one or more (1 through N) input channels concurrently, processes the video signals, and outputs the video signals through at least one output channel to the video display apparatus. The video signals can be input from a camcorder, videotape recorder, DVD (Digital Versatile Disk) player, personal computer or the like. The video signals are output through an output channel to a monitor, video projector or the like. Although FIG. 1 has only one output channel, the video signal processing apparatus may have a plurality of output channels so that input video signals can be mixed separately to output through a separate output channel such as a channel for an operator's monitor.

The video processing parameter setting apparatus 2 is for setting a plurality of parameters for enabling the video signal processing apparatus 1 to process video signals. The video processing parameter setting apparatus 2 is different from the conventional apparatuses using "real-time scene data" in that the video processing parameter setting apparatus 2 has the capabilities of switching sets of scene data in accordance with an instruction of switch timing (periodically output beat timing signal), switching sets of scene data one after the other in accordance with an arpeggiator pattern, and gradually switching sets of scene data such as a crossfade interpolation process. Moreover, various embodiments can be achieved by combining the above-described capabilities. The video processing parameter setting apparatus 2 is also capable of reproducing conventional "real-time scene data". On reproducing the conventional "real-time scene data" as well, the video processing parameter setting apparatus 2 can exert the capabilities of switching sets of scene data in accordance with the periodically output beat timing signal and gradually switching sets of scene data.

A parameter value collectively specifying portion 3 has a scene data memory 6 and an arpeggiator pattern memory 7. The parameter value collectively specifying portion 3 collectively specifies as a set of "visual arpeggiator scene data", a plurality of parameter values stored in the scene data memory 6, being capable of specifying different sets of scene data. The detail of parameter values to be collectively specified as a set of scene data will be described later on with reference to FIG. 2(a) and FIG. 6, however, the parameter values preferably include those for selecting video signals to be assigned to one or more input channels and specifying the on/off of input channels and the layout of video pictures transmitted from input channels. A parameter value for specifying desired image quality of video signals transmitted from each input channel can be also included. The sequential specification of sets of scene data allows for the switching of a video picture to be assigned to an input channel or the change in the layout of a video picture displayed on a screen, resulting in impressive and effective video signals to be output.

The parameter value collectively specifying portion 3 is capable of specifying in sequence, a set of "visual arpeggiator scene data" from among sets of "visual arpeggiator scene data" in accordance with a given order stored in the arpeggiator pattern memory 7. As a result, the parameter value collectively specifying portion 3 can specify sets of scene data one after the other in a given order, allowing the operator to achieve sophisticated video processing with easy operation. The above term, "visual arpeggiator" is not a commonly used technical term. On playing the keyboard instruments or the guitar, "arpeggio" refers to a technique for playing a broken chord in which individual notes comprising a chord are played one after the other. In the present description, the term called "visual arpeggiator" (hereinafter, simply referred to as "arpeggiator") is used to indicate a technique for setting parameters for video processing. In the technique, sets of scene data specifying video processing parameters for processing video signals input from one or more input channels are switched in sequence in accordance with an arpeggiator pattern (a kind of sequence patterns) specifying a given order. Basically, hereinafter, the "arpeggiator scene data" regarding the present invention is simply referred to as "scene data".

A changing process portion 4 sets, on the video signal processing apparatus 1, values of a plurality of video processing parameters associated with operating elements such as various setting switches, setting volume controls, faders, etc. When a reproduction switch is operated in arpeggiator automatic reproduction (drive) mode, the changing process portion 4 also changes a plurality of parameter values into the parameter values collectively specified by the parameter value collectively specifying portion 3 as a set of scene data stored in the scene data memory 6 to be reproduced and sets the changed values on the video signal processing apparatus 1. As described above, sets of the scene data are to be reproduced one after the other in accordance with a predetermined order.

Every time the changing process portion 4 receives switch timing signal from a switch timing outputting portion 5, the changing process portion 4 changes parameter values into the corresponding parameter values which have been collectively specified as a set of scene data by the parameter value collectively specifying portion 3. The switch timing outputting portion 5 has a period-programmable beat timing generating portion 8 therein. By use of the beat timing signal which is periodically output from the beat timing generating portion 8, the switch timing outputting portion 5 outputs the beat timing signal. As a result, since sets of scene data can be switched one after the other in synchronization with the beat timing signal, the operator can achieve the video processing which matches with the time progression of music, images or the like with easy operation. To switch the scene data, the switch timing signal may also be output at the timing when a trigger switch is operated. Instead of the beat timing, the timing to switch the scene data may be arbitrarily defined in time or clock.

In addition, the changing process portion 4 may gradually change values of video processing parameters. More specifically, the changing process portion 4 starts changing, at the timing corresponding to a change time, the current settings of the parameter values set on the video signal processing apparatus 1 into the parameter values collectively specified as a set of scene data. At this occasion, the changing process portion 4 finishes the changing process and set the new parameter values on the video signal processing apparatus 1 on the switch timing. At the completion of the changing process, more specifically, the parameter values collectively specified as a set of scene data are set on the video signal processing apparatus 1. The timing to start changing video processing parameters can be set in between adjacent beat positions by operator's manipulation on a change time dial.

When a scene recording switch is operated, the parameter value collectively specifying portion 3 stores, in the scene data memory 6, the parameter values corresponding to the amount indicated by each of the operating elements such as the setting switches, setting volume controls and faders on the operating panel. The parameter values to be stored are those previously selected as a set of scene data from among video processing parameters corresponding to the setting switches, setting volume controls, faders, etc. At this storing, since the storage allocation is determined by an operation of a scene switch, the scene data memory 6 can store sets of scene data. On the other hand, when a pattern recording switch is operated, and scene switches are operated in a desired order, the parameter value collectively specifying portion 3 stores the operated order in the arpeggiator pattern memory 7. At this storing, since the storage allocation is determined by an operation of a pattern switch, the arpeggiator pattern memory 7 can store a plurality of arpeggiator patterns.

As for the above-described scene data and arpeggiator patterns, preset and factory-configured settings may be stored in a storage device. Moreover, scene data may also contain video processing parameters which have no corresponding operating elements on the operating panel. In addition, the parameter value collectively specifying portion 3 may be adapted to automatically create scene data and arpeggiator patterns in accordance with a predetermined algorithm. In this case, the automatic creation can be done only by storing the algorithm.

Figure 2:
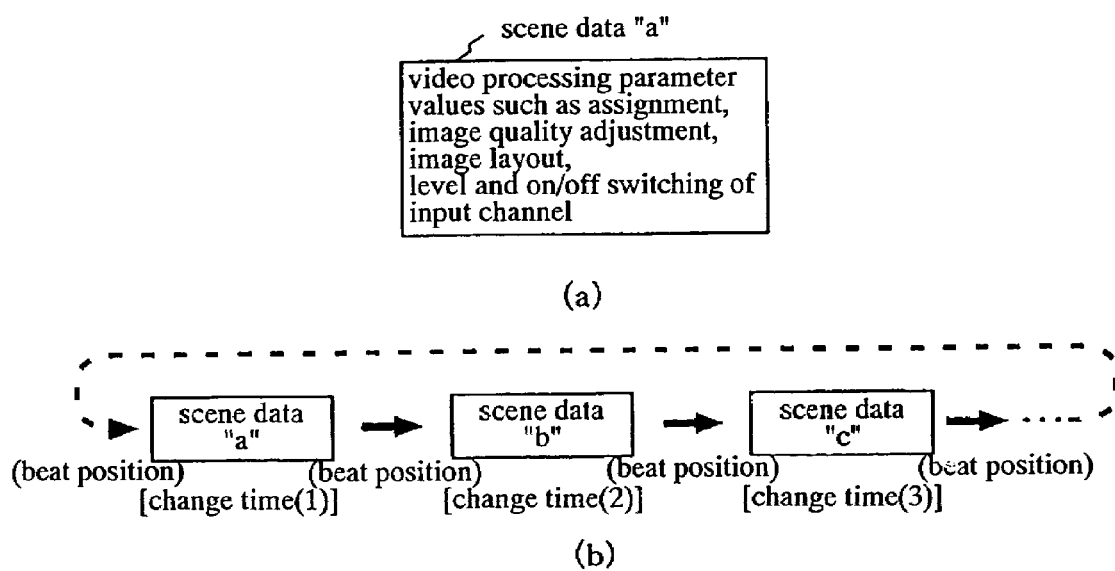
FIG. 2 is a diagram illustrating a method for switching scene data according to the functional configuration shown in FIG. 1.

FIG. 2 is a diagram illustrating a method for switching scene data according to the functional configuration shown in FIG. 1. In the figure, FIG. 2(*a*) illustrates a set of scene data, while FIG. 2(*b*) illustrates sets of scene data specified in sequence in accordance with a given order. As shown in FIG. 2(*a*), video processing parameters to be collectively specified as a set of scene data include those defining the selection of video signals to be assigned to input channels, the image quality adjustment and image layout (vertical and horizontal sizes of an image, and image layout on the full screen) of each input channel, the level, etc. In addition, the video processing parameters may also include those parameters which relate to output channels through which video signals are to be transmitted. In accordance with a predetermined order (an arpeggiator pattern), as shown in FIG. 2(*b*), sets of scene data are specified in sequence such as scene data "a" scene data "b" scene data "c" . . . . Typically, sets of scene data are switched at every beat position. The arpeggiator pattern is the order defined when the operator has operated the scene switches 1, 2, 3 . . . in his/her desired order for storing an arpeggiator pattern. The arpeggiator pattern is stored in the arpeggiator pattern memory 7, and sets of scene data are to be reproduced one after the other in accordance with this pattern.

When performing a crossfade interpolation process, the changing process portion 4 provides the scene data (a), (b) and (c) with a change time (1), (2) and (3), respectively, in between adjacent beat positions. The operator can select the "loop" of an arpeggiator pattern and specify the number of times the loop is iterated. After a set of scene data positioned in the last of an arpeggiator pattern has been reproduced, the reproduction returns to the set positioned in the first to reproduce the scene data "a". The real-time operations of various setting switches or the like may be enabled during the arpeggiator mode. Alternatively, the real-time operations may also be disabled. An arpeggiator pattern, which contains sets of scene data, may have two or more sets of the same scene data set. An arpeggiator pattern may have only one set of scene data. Even in such a case, the "loop" may be selected.

Described above has been the arpeggiator automatic reproducing mode done by the parameter value collectively specifying portion 3. In arpeggiator push'n push mode, every time the operator operates a scene switch without operating the reproduction switch, the changing process portion 4 sets on the video signal processing portion 1 at the subsequent switch timing, video processing parameters collectively specified in accordance with a corresponding set of scene data. Further, in arpeggiator jog (shuttle) mode, the changing process portion 4 lays out two sets of scene data by setting video processing parameters for these scene data sets between which the crossfade interpolation process is performed in accordance with the operated amount of a jog shuttle.

Figure 3:
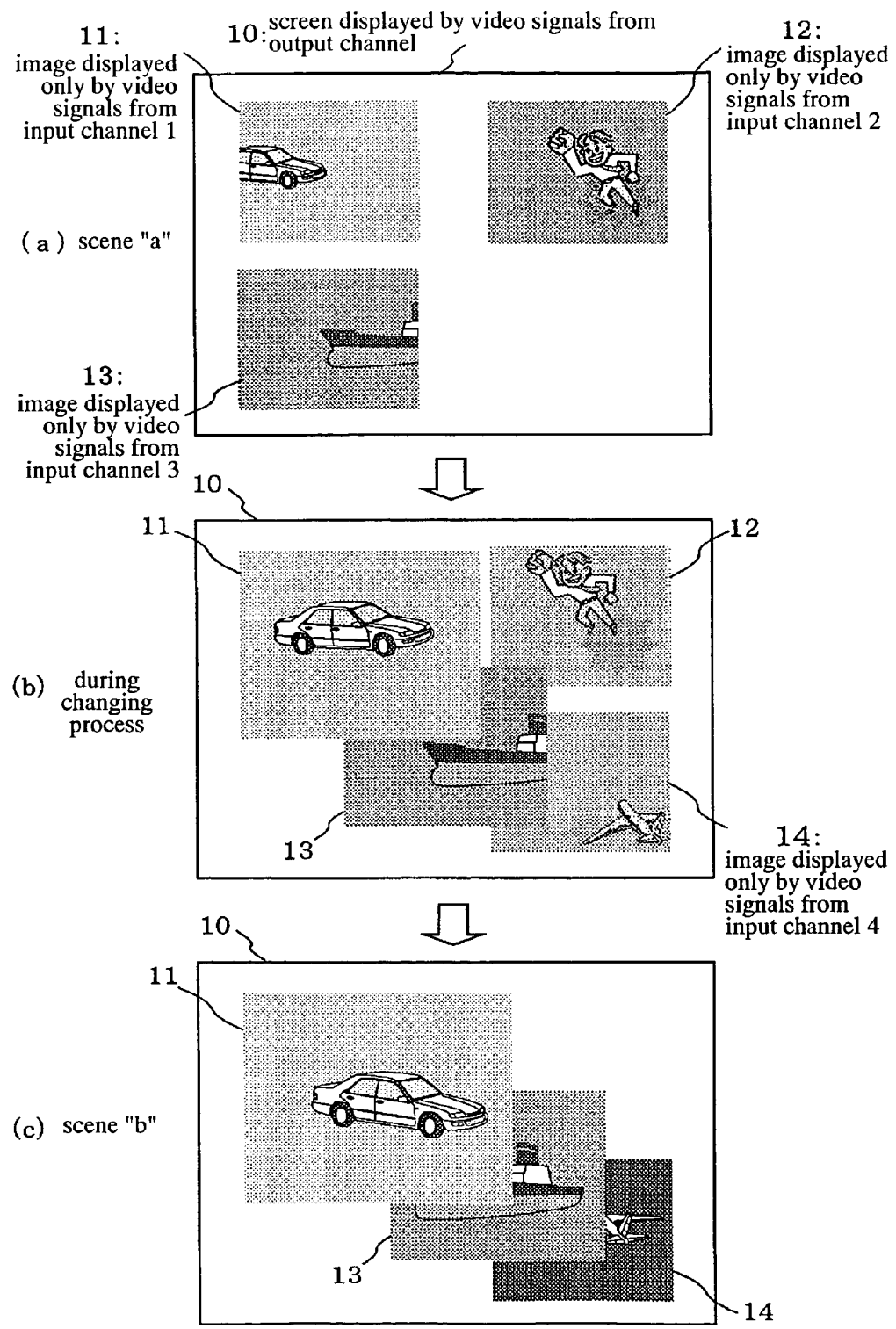
FIG. 3 is a drawing illustrating screens displaying a specific example of a visual effect according to the functional configuration shown in FIG. 1.

FIG. 3 is a drawing illustrating screens displaying a specific example of a visual effect according to the functional configuration shown in FIG. 1. FIG. 3(a) illustrates a screen to be displayed when video processing parameters are collectively specified as scene data "a". FIG. 3(c) illustrates a screen to be displayed when video processing parameters are collectively specified as "scene data "b" while FIG. 3(b) illustrating a screen to be displayed at a given timing during the crossfade interpolation process. Content to be represented by video signals vary as time progresses. In FIG. 3, numeral 10 indicates a screen displayed by video signals transmitted from an output channel, while numerals 11 through 14 indicate images displayed only by video signals transmitted from input channels 1 through 4. The example of FIG. 3 illustrates a case where the input channels are set to "layer mode" without crossfade synthesis between the input channels. Therefore, priorities are assigned to the input channels when images displayed only by video signals from the input channels 1 through 4 are overlaid. The priorities are assigned from the front to back in the following order: input channels 1>2>3>4 . . . , however, the priorities may be assigned arbitrarily. Other channel which is not set to "layer mode" is used as the background.

When the screen is switched from FIG. 3(a) to FIG. 3(c), the parameters have been changed so that the image 11 displayed using video signals from the input channel 1 is enlarged with the location (center) of the image 11 being moved in the lower right direction. In FIG. 3(b), the size and location of the image vary in accordance with the time progression during the changing process. On the other hand, the image 12 displayed using video signals from the input channel 2 has been disappeared when the screen is switched from FIG. 3(a) to FIG. 3(c). In FIG. 3(b), the image is displayed with opaqueness in accordance with the time progression during the changing process. More specifically, as the crossfade interpolation process for cross-fading the images from the scene data "a" where the input channel 2 is set on "on" to the scene data "b" where the input channel 2 is set on "off", the gains (each gain of luminance signal Y, color-difference signal Cr and color-difference signal Cb) of each input channel are processed.

When the screen is switched from FIG. 3(a) to FIG. 3(c), the parameters have been changed so that the image 13 displayed using video signals from the input channel 3 is enlarged with the location of the image 13 being moved in the upper right direction. In FIG. 3(b), the size and location of the image vary in accordance with the time progression during the changing process. Although the image 14 displayed using video signals from the input channel 4 is not displayed on FIG. 3(a), the image 14 appears when the screen is switched to FIG. 3(c). In FIG. 3(b), the image is displayed with opaqueness (the gains of each input channel) in accordance with the time progression during the changing process. In the illustrated example, although the aspect ratio and image quality of the image from each input channel are not changed, the aspect ratio and image quality may be changed. In addition, the crossfade interpolation process may also be performed during the changing process in order to change the aspect ratio and image quality.

The descriptions for FIGS. 2 and 3 have detailed the switching between the two scene data sets. The switching described above may also be applied to cases where in a state the operator manipulates the operating elements in real-time to set parameters on the video signal processing apparatus 1, a set of scene data is read out from the parameter value collectively specifying portion 3 to collectively set video processing parameters at a given switching timing. In such cases, the screen shown in FIG. 3(a) can be regarded as the present screen. As for the crossfade interpolation process during changing process as well, video processing parameters collectively specified by the scene data "a" can be substituted for video processing parameters currently set on the video signal processing apparatus 1.

FIG. 4 is a first diagram illustrating a process for changing scene data according to the functional configuration shown in FIG. 1. FIG. 4(a) illustrates an arpeggiator pattern. The arpeggiator pattern memory 7 stores arpeggiator patterns. The arpeggiator pattern contains pieces of information each identifying a set of scene data and change times provided for the scene data sets. The information comprises scene "a"→ scene "b"→ scene "c", each of which specifies a scene data as well as the order of these scene data sets. The information specify, for example, 25%, 25% and 50% as change times. FIG. 4(b) illustrates a specific example of processing to switch scene data sets which are to be switched in sequence in accordance with the arpeggiator pattern. The lateral axis represents time, while the vertical axis representing the coefficient of interpolation to be multiplied by a video processing parameter, the coefficient being between or equal to 0 and 1.

During the changing process started at the change time, the coefficient of interpolation to be multiplied by a pre-change value (the current value) of each video processing parameter is gradually reduced from 1 to 0. On the other hand, the coefficient of interpolation to be multiplied by a post-change value of each video processing parameter specified by a post-change scene data set is gradually increased from 0 to 1. Each parameter value in changing process is obtained by adding the pre-change value obtained by multiplying by the above coefficient of interpolation to the post-change value obtained by multiplying by the above coefficient of interpolation. The crossfade interpolation process is performed by the above-described computation. The shape of the change curve of the interpolation coefficient is not necessarily linear but may be arbitrarily determined. The sum of the interpolation coefficient to multiply the pre-change value and the interpolation coefficient to multiply the post-change value is adapted to be 1, however, the sum may not be 1 when a special effect is sought.

In the changing process, a start timing is provided between a beat position where a scene data set is collectively specified and the immediately preceding beat position. With an interval of adjacent beat positions being set as a base (100%), the value of a change time specifies the start timing. If a change time is 100%, the interpolation processing is started at an immediately preceding beat position. With a change time of 0%, a scene data set is instantaneously switched to a subsequent scene data set without interpolation processing. The above-described crossfade interpolation processing is a technique to gradually switch from pre-change image to post-change image in a given length of time. Therefore, applicable techniques are not limited to the crossfade interpolation processing but may be any techniques as far as they are capable of gradually switching between images in a given length of time.

FIG. 4(b) illustrates a case where the timing to start automatic reproduction of an arpeggiator pattern is provided before the timing to start the interpolation process. Therefore, by the changing processing similar to processing to change from scene data "a" to scene data "b", "the current parameter values" can be switched to the values specified by the first scene data "a". However, different changing processing may be required depending on the correlation between positions of start timings and beat positions. FIGS. 4(c) through 4(e) illustrate the processing for changing scene data at the initiation of automatic reproduction. In FIGS. 4(c) through 4(e), an interval between beat positions is divided into three periods of A, B and C. As shown in FIG. 4(c), if a timing of starting automatic reproduction is placed within the marginal period A of the beat position, the beat position is regarded as the start timing with video processing parameters collectively specified by the first scene data "a" being immediately set on the video signal processing apparatus 1.

As shown in FIG. 4(d), if a timing of starting automatic reproduction is placed within the period B which follows the marginal period A of the beat position and precedes a change time (1) specified by the first scene data "a", parameter values are gradually changed from "current values" presently set on the video signal processing apparatus 1 to those collectively specified by the first scene data "a" in a given length of time (spending time from the change time (1) to the subsequent beat position). As shown in FIG. 4(e), if a timing of starting automatic reproduction is placed within the period C which follows the change time (1) specified by the first scene data "a" and is excluded from the marginal period A of a subsequent beat position, parameter values are immediately changed at the subsequent beat position into parameter values collectively specified by the first scene data "a" without performing the gradual changing process. In the examples shown in the figures, in consideration of operator's inaccurate operation in instructing a timing of starting automatic reproduction, the marginal period A is provided. When a timing to start automatic reproduction is placed within the marginal period A of a beat position, the beat position is regarded as the start timing, resulting in parameter values being changed as intended by the operator. However, the marginal period A may be eliminated, with only the periods B and C being left between the beat positions.

As described above, by varying changing processing in accordance with the position of the timing of starting automatic arpeggiator reproduction, the changing processing can be performed naturally at the start of automatic reproduction in synchronization with the beat timing. The above-described changing processing may be replaced by a method in which when the last scene data "c" is specified, the "current setting values" which have been set on the video signal processing apparatus 1 prior to the reproduction of the first scene data "a" are re-specified. In such a method, the "current setting values" are temporarily stored collectively as a set of scene data to read out at the end of the arpeggiator pattern. In this case as well, there may be provided a period to gradually change the scene data set such as the crossfade interpolation. The change time for the period may be determined according to the operated amount of a change time dial operated at the automatic reproduction.

Figure 5:
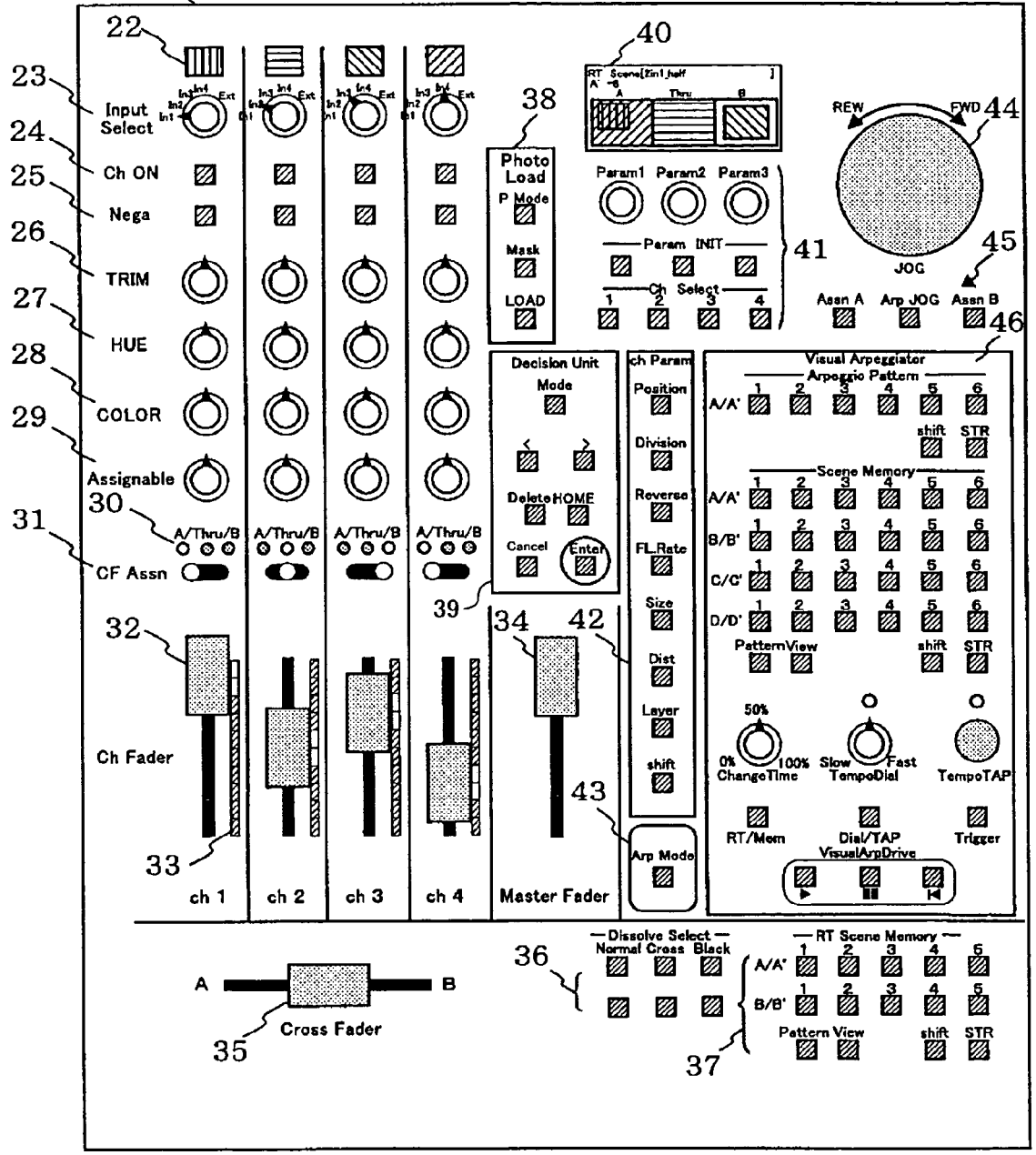
FIG. 5 is a drawing illustrating a specific example of an operating panel of a video processing apparatus realizing the functional configuration shown in FIG. 1.

FIG. 5 is a drawing illustrating a specific example of an operating panel of a video processing apparatus realizing the functional configuration shown in FIG. 1. In FIG. 5, numeral 21 indicates an operating panel, which includes operating elements which are not directly involved in the present invention. The operating panel has operating elements for setting values of parameters for processing video signals. Among those operating elements, some are provided for each of the input channels 1 through 4, while others are used for all the channels in common by specifying one channel.

Numeral 22 indicates display patterns, each of which represents a channel. The display patterns, which have been printed on the operating panel 21, are used in order to display on a screen of a displayer 40, the image size and layout of a selected input channel. In FIG. 5 the displayer 40 displays images for input A, input B and Thru of a crossfader 35. Numeral 23 indicates switches (5-in-1 selectors) for defining the assignment of video signals input to four video signal input terminals and one still image input terminal (external) to the input channels 1 through 4. The assignment does not necessarily require one-to-one correspondence between the input terminals and input channels. More specifically, video signals to be input to one input terminal may be divided into two or more input channels, while video signals to be input to two input terminals may be synthesized to supply to one input channel. Numeral 24 indicates switches for setting ON/OFF of a channel. Numeral 25 indicates switches for switching video signals from a channel between positive mode and negative mode. Numeral 26 indicates trim volumes (gain volumes used for Y and C in common). Numeral 27 are color adjusting (HUE) volumes, while numeral 28 indicates color gain (COLOR) volumes. Numeral 29 indicates assignable volumes. To each of the assignable volumes, there may be assigned a video processing parameter from among video processing parameters specified on a channel commonly controlling portion 41.

Numeral 31 indicates crossfader assigning switches for selecting to which one of Input A, Input B and Thru (not to be directed to the crossfader 35) of the crossfader 35 video signals are to be sent. Numeral 30 indicates light-emitting diode elements for representing a selected state. Numeral 32 indicates faders for adjusting the level of an input channel. Numeral 33 indicates LED level meters representing the current operated amount of the fader 32. Numeral 34 indicates an output channel (main) fader for adjusting the level of synthesized video signals. Numeral 35 indicates a crossfader for setting the mixing ratio of the signals transmitted to the Input A and Input B. Numeral 36 indicates various switches for specifying a crossfading method (Dissolve Select).

Numeral 37 indicates various switches for setting conventional real-time scene data. Numeral 38 are switches used for loading still images from a memory card to the external input terminal. Numeral 39 indicates system-controlling switches by which all the operations can be entered, canceled, deleted, etc. Numeral 40 is a displayer indicating the status of established video processing parameters. Numeral 41 indicates the channel commonly controlling portion which includes various switches and rotary encoders. To establish settings on the channel commonly controlling portion 41, one channel is selected. In association with the channel commonly controlling portion 41, there are provided switches 42 for specifying types of video processing parameters to be processed. The types include the position movement of an image (Position), the number into which an image is to be divided (Division), reverse of an image (Reverse: lateral, vertical, both axes), frame rate (FL. Rate: the number of video frames per second), size of image (Size), distortion (Distortion: distortion factor, LFO speed, types of distortion), layer (Layer: availability of layer display), etc. of each input channel.

Numeral 43 is a switch for selecting the arpeggiator mode. The operation of switch 43 switches between the arpeggiator mode and real-time mode. Numeral 44 is a jog-shuttle control for fine-tuning video processing parameters for each input channel. Along with scene data assigning switches A and B, and an arpeggiator jog switch 45, etc, the jog-shuttle control 44 is also used for controlling the arpeggiator jog mode. Numeral 46 indicates operating elements relating to the arpeggiator automatic reproduction (drive) mode whose details will be described with reference to enlarged FIG. 6.

Figure 6:
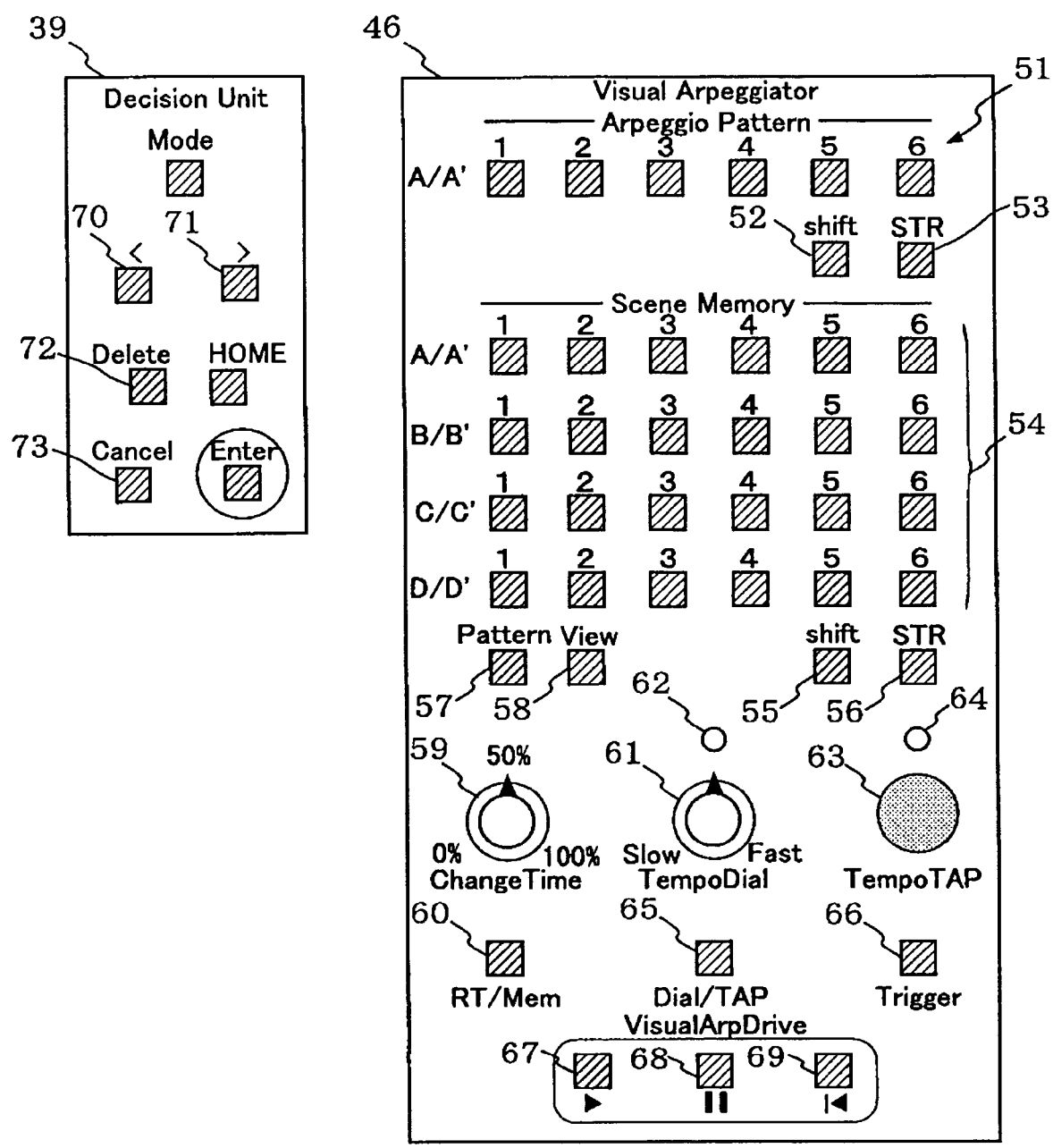
FIG. 6 is a drawing illustrating part of the operating panel shown in FIG. 5.

FIG. 6 illustrates an enlarged part of the operating panel shown in FIG. 5. FIG. 6 also shows the switches 39 for controlling the system, the switches 39 being cited in the descriptions of a flowchart which will be explained later. Numeral 70 indicates a left-pointing switch [<], while 71 is a right-pointing switch [>]. Numeral 72 indicates a delete switch [Delete], while 73 is a cancel switch [Cancel]. Among the operating elements 46 relating to the arpeggiator automatic reproduction mode, numeral 54 indicates scene switches for specifying where to store individual scene data sets. In the illustrated example, there are provided 24 (6×4) button switches as lines A through D. With a simultaneous operation of a shift switch [Shift] 55, the button switches provide different storage locations as lines A' through D'. As a result, a total of 48 sets of scene data can be stored for arpeggiator. A scene recording switch [STR] 56 is used for providing an instruction for recording scene data. Numeral 51 indicates pattern switches for specifying where to store individual arpeggiator patterns. In the illustrated example, with a simultaneous operation of the shift switch 52, the pattern switches provide different storage locations as line A' for line A. As a result, a total of 12 arpeggiator patterns can be stored. A pattern recording switch [STR] 53 is for providing an instruction for recording a pattern.

With reference to FIG. 7, scene data and arpeggiator pattern will be described in detail. FIG. 7 is a diagram showing the memory configuration illustrating scene data and arpeggiator patterns in the functional configuration shown in FIG. 1. FIG. 7(*a*) is a diagram illustrating memory areas storing sets of scene data. Each area corresponds to one of the scene switches 54 which specifies an area to store/reproduce a set of scene data. For the sake of simplifying the descriptions, the memory is regarded as storing scene data "1" through scene data "6". FIG. 7(*b*) is a diagram illustrating memory areas storing arpeggiator patterns. Each area corresponds to one of the pattern switches 51 which specifies an area to store/reproduce an arpeggiator pattern. For example, the memory is regarded as storing arpeggiator patterns (1) through (4). The arpeggiator pattern (1) contains "scene $a_1$" through "scene $e_1$" as information identifying a set of scene data. In the illustrated example, an arpeggiator pattern is specified in accordance with the order in which pieces of information identifying scene data are stored. The arpeggiator patterns may have either different lengths or the same length. Further, the length of an arpeggiator pattern may be arbitrarily determined.

In the illustrated example, the arpeggiator pattern memory stores information identifying scene data along with change time ($1_1$) through change time ($5_1$) in association with the sequence of an arpeggiator pattern. The value of a change time is provided according to an operated amount of a change time dial 59 when the scene switches 54 are operated one after the other in order to specify a scene. The operator may determine at each operation for the automatic reproduction whether to loop the arpeggiator pattern or not, and if necessary, the operator may also determine the iteration count for the loop. Alternatively, an arpeggiator pattern may have the specification about the loop and iteration count at the end thereof. A set of scene data may not necessarily include all types of parameters establishable through the operating elements on the operating panel 21. That is, those parameters mainly intended for manual adjustment in real-time such as the crossfader assigning switch 31, output channel fader 34 and crossfader 35 are preferably excluded. Therefore, parameters to be stored in scene data are those to be set separately for each channel (except the crossfader assigning), those to be shared by all the channels and those relating to photo-load.

There are cases where the level of a video processing parameter pointed by the fader 32 of an input channel does not coincide with the actual level of the parameter at the reproduction. However, the level meter 33 indicates the set level at all times. In order to enable the subsequent manual setting operation of the fader 32, the condition that the fader 32 be temporarily positioned at or passed through the level indicated by the level meter 33 may be provided. Alternatively, the fader 32 may be designed such that, by adopting the motor-driven fader 32, the position of the fader 32 is automatically moved to the level specified by the video processing parameter of the scene data. The recording capability of the scene switches 54 is not limited to the recording of current settings indicated by all the operating elements corresponding to the video processing parameters to be collectively specified. By using the overdubbing technique, the recording of video processing parameters may be repeated for multiple times for separate input channels, for example. The video processing parameters obtained in respective recordings may be then synthesized to be stored as an additional set of scene data.

Here, the explanation will be returned to FIG. 6. Although the sequence in which sets of scene data are arranged is determined arbitrarily by the operator, the arrangements of the scene switches 54 on the operating panel, that is, the arrangements of the scene switches 1 to 6 of the lines A to D and A' to D') may be previously stored as arpeggiator patterns. If a view switch [View] 58 is operated, a brief description about a scene data set selected through an operated scene switch 54 is displayed on the screen of the displayer 40. When the same scene switch 54 is operated again, the selection of the scene data set indicated by the scene switch 54 is confirmed. A preset pattern switch [Pattern] 57 is for reading out various types of preset scene data. At every operation of the preset pattern switch 57, a different set of preset scene data is read out. By operating the jog-shuttle control 44 as well, a different set of preset scene data can be read out one after the other.

If, in a case where a memory area corresponding to one of the pattern switches 51, (e.g., pattern switch "1") has already stored the order of the arpeggiator pattern (1), the pattern switch "1" is operated again to specify the same memory area, and the scene switches 54 are operated, the new scene data set can be appended to the original order. In FIG. 7(*b*), more specifically, scene $f_1$, scene $g_1$, . . . are appended to the scene $e_1$. Thus, the operator can append sets of scene data to create a long pattern.

Numeral 59 is the change time dial which has been already explained. By use of the change time dial 59, the operator specifies the timing of starting changing, with the interval between beats of tempo taken as 100%. Numeral 60 indicates a real-time/memory selection [RT/Mem] switch for determining whether to use the change time of FIG. 7(*b*) stored in an arpeggiator pattern or the operated amount of the change time dial 59 during reproduction for specifying the timing to start changing. Numeral 61 is a tempo dial for setting a sub-tempo relative to a main-tempo (an interval between beat timings). More specifically, the operator adjusts the speed of the sub-tempo with respect to the main-tempo. The sub-tempo can be adjusted between 25 quarter note per minute and 400 quarter note per minute. Numeral 62 is a light-emitting diode indicator which blinks at each beat position while the beat timing of the sub-tempo is chosen. Numeral 63 is a tempo tap switch for defining a main-tempo. To define the main-tempo, the operator taps the tap switch 63 for a plurality of times. The mean value of the intervals of the tapped timings is set as the main-tempo. If the tap switch 63 is tapped for 2 times or more, the interval between the last tap and its preceding tap may be set as the main-tempo. Instead of the last two taps, a predetermined number of the last taps may be extracted to obtain the mean value of the intervals between the extracted taps. Numeral 64 is a light-emitting diode indicator which blinks at each beat position while the beat timing of the main-tempo is chosen. A dial/tap switch 65 is used for determining whether to use beat positions specified by the tap switch 63 or the tempo dial 61. In other words, the operator determines through the use of the dial/tap switch 65 whether to use the main-tempo or sub-tempo for switching scene data.

FIG. 8 is a diagram illustrating the function of a switch timing outputting portion 5 in the functional configuration shown in FIG. 1. In FIG. 8, beat positions (switch timings) of the main-tempo defined by the tap switch 63 are indicated by beat positions "m", while beat positions (switch timings) of the sub-tempo defined by the tempo dial 61 are indicated by beat positions "s". In the illustrated example, beat timing signals of the both tempos are generated in parallel, however, beat timing signals of either of the two tempos are output. When the operator has switched the beat timings from the main-tempo to sub-tempo through the use of the dial/tap switch 65, the phase of the sub-beat timing signals is returned to zero, and the beat position "s" is output.

The sub-tempo is used when the performance is in full gear, that is, when the operator desires to temporarily increase the tempo such as the cases where the operator desires to drastically switch video processing parameters. The sub-tempo can be also used when the operator desires to temporarily decrease the tempo. Since both of the sub-tempo and main-tempo are generated in parallel, instant switching between the tempos is possible. Particularly, since switching from the main-tempo to the sub-tempo requires scene data to be switched instantly, the dial/tap switch 65 enables the operator to respond quickly to the drastically changing situations. In the illustrated example, on the other hand, when the operator has switched the beat timings from the sub-tempo to main-tempo through the use of the dial/tap switch 65, beat positions "m" are output, without returning the phase of the main-beat timing signals to zero. On the switching from sub-tempo to main-tempo, the phase of main-beat timing signals may be returned to zero to switch scene data. However, the switching without returning the phase of the main-beat timing signals to zero has an advantage in emphasizing an instant effect because the instant switching of beat timing is followed by the output of the beat positions "m" with the phase of steady periodicity.

In the illustrated example there are provided 2 different types of beat timings, however, 3 or more types of beat timings may be provided. A plurality of independently provided main-tempos may be substituted for the different types of beat timings. The above-described light-emitting diode indicators 62 and 64 are provided in order to indicate the current selection between the main-tempo and sub-tempo, however, the light-emitting diode indicators 62 and 64 may be adapted to blink at every beat timings regardless of the current selection in order to allow the operator to monitor the beat positions "m" and beat positions "s" of the main-tempo and sub-tempo. In order to allow the operator to recognize the tempo whose timings are currently output, the light-emitting diode indicators 62 and 64 may be adapted such that the light emitting diode indicator for the currently output tempo illuminates more brightly or has a different color than the other.

Figure 9:
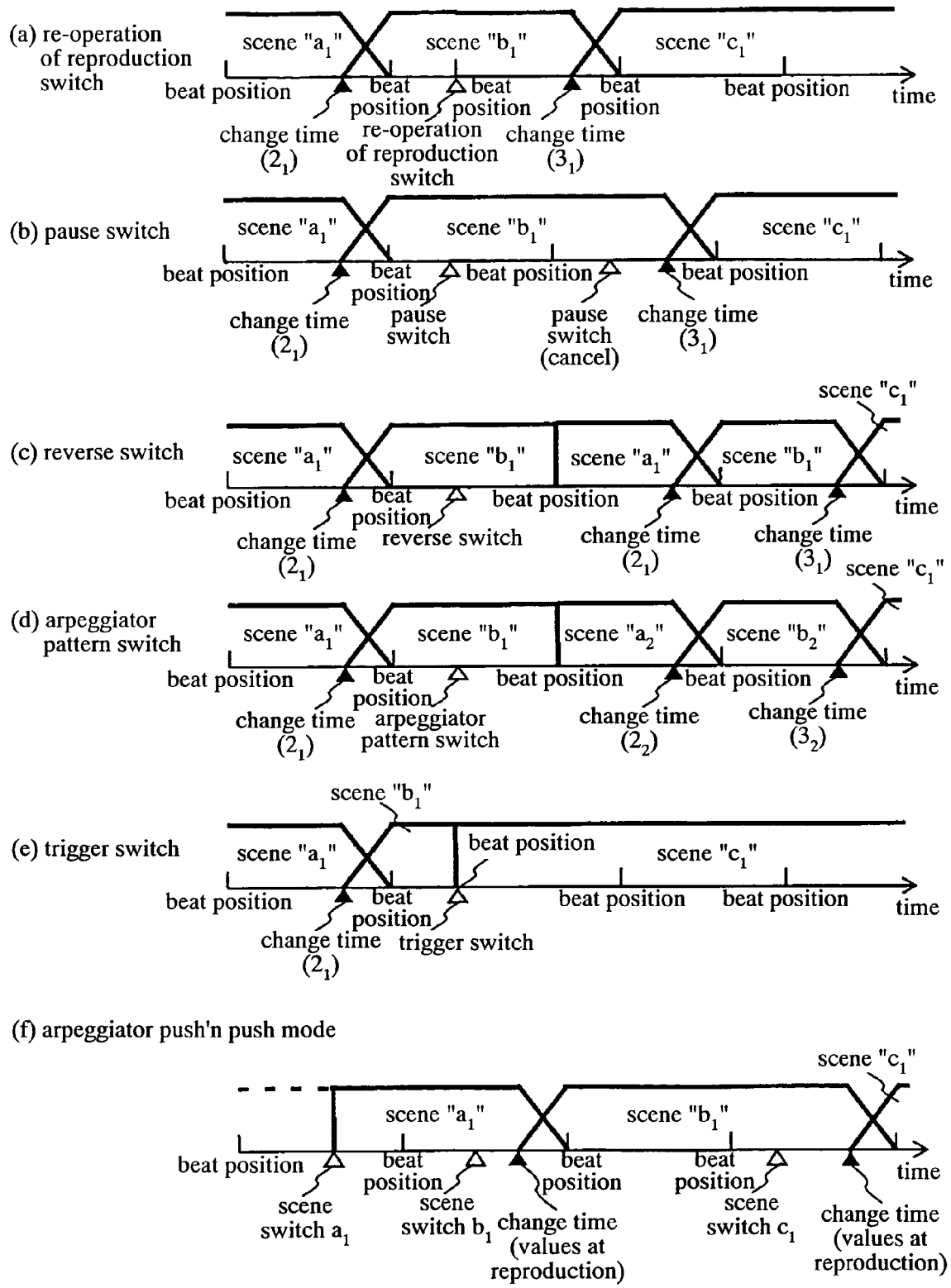
FIG. 9 is a second diagram illustrating a process for changing scene data according to the functional configuration shown in FIG. 1.

FIG. 9 is a second diagram illustrating a process for changing scene data according to the functional configuration shown in FIG. 1. With reference to FIGS. 6 and 4, explained will be the process for changing scene data in a case where, in the arpeggiator automatic reproduction mode, the reproduction switch 67 which has been operated to start the arpeggiator automatic reproduction, a pause switch 68, a reverse switch 69 for returning to the beginning, the arpeggiator pattern switches 51 and a trigger switch 66 are operated. The explanation will be given, assuming that 3 sets of scene data of scene "$a_1$", scene "$b_1$" and scene "$c_1$" are specified as arpeggiator pattern (1). As shown in FIG. 9(*a*), the reproduction switch 67 is operated again in a state where the scene data "$b_1$" has been specified (the reproduction switch 67 is supposed not to be operated again). Then, the phase of beat timing signals of currently selected tempo is set at "0", and a switch timing signal is output by returning to the preceding beat timing. On the output of the switch timing signal, the scene data "$b_1$" currently being reproduced is re-specified to immediately reproduce the values of video processing parameters to be specified as the scene data "$b_1$".

If the re-operation of the reproduction switch 67 precedes the timing of starting a change as shown in FIG. 9(*a*), the period during which the currently reproduced scene data "$b_1$" is used can be extended. Particularly, if the re-operation of the reproduction switch 67 occurs within the period of the changing process performed after the change time ($3_1$), the crossfade interpolation process is suspended to immediately reproduce the values of video processing parameters specified as the scene data "$b_1$". During the arpeggiator automatic reproduction mode as well, in a case where the operator is permitted to manually operate the setting switches, the values of video processing parameters changed through the manual operations can be reproduced again as the values of the video processing parameters specified as the scene data "$b_1$". As described above, the period during which the currently reproduced scene data is used can be extended, while the currently reproduced scene data can be restarted in order to produce a repetitive effect.

As shown in FIG. 9(b), when the pause switch 68 is operated, the current values set on the video signal processing apparatus 1 are not changed even at a beat position to keep the current settings. In addition, the phase of beat timing signals is not reset. When the pause switch 68 is operated again, the subsequent scene data is reproduced from the subsequent beat position. At the reproduction, in accordance with the correlation between the timing when the pause switch 68 is operated again and the timing of the starting a process for changing to the subsequent scene data, the interpolation process may be changed in the same manner as FIGS. 4(c) through (e).

As shown in FIG. 9(c), when the reverse switch 69 for returning to the beginning is operated, the phase of beat timing signals is not reset, but at the subsequent beat position, the values of the video processing parameters are changed from the values currently set on the video signal processing apparatus 1 (the values set as the currently adopted scene data "$b_1$" if no manual setting operation has been given) to the values set as the first scene data "$a_1$" in the currently set arpeggiator pattern (1). Then, in accordance with the arpeggiator pattern (1), the sets of the scene data $b_1$ and $c_1$ are specified one after another at each beat position to change to the parameter values collectively specified by each set of the scene data. The phase of beat timing signals is not reset.

As shown in FIG. 9(d), when a given arpeggiator pattern switch, e.g., the pattern switch 2 (the pattern switch 1 which has already been operated is also available) is operated, the values of video processing parameters are changed from those currently set on the video signal processing apparatus 1 to those collectively specified as the first scene data "$a_2$" of the operated arpeggiator pattern (2). Then, in accordance with the order specified by the arpeggiator pattern (2) corresponding to the operated arpeggiator pattern switch 2, sets of scene data (scene data "$a_2$", scene data "$b_2$" . . . ) are specified one after the other at each beat position. In this case as well, the phase of beat timing signals is not reset. As shown in FIG. 9(e), when the trigger switch 66 is operated, the phase of the beat timing signals of currently selected tempo is set at "0" to output a switch timing signal. Due to the output of the switch timing signal, the start timing of the subsequent scene data can be adjusted. In accordance with the order specified by the arpeggiator pattern (1), the subsequent scene data ($c_1$) is specified. In the above-described FIG. 9(a) through FIG. 9(e), if the timing when the switch is operated during automatic reproduction is situated within the interpolation process, the interpolation process may be suspended.

The last FIG. 9(f) illustrates a changing operation performed not in the arpeggiator automatic reproduction mode but in the arpeggiator push'n push mode. In a state where the arpeggiator mode has been selected by the arpeggiator mode selecting switch 43 shown in FIG. 5, if a given scene switch 54 is first operated, the arpeggiator push'n push mode is entered, and video processing parameters collectively specified by the first scene data (scene data "$a_1$" in the illustrated example) are immediately set. Then, every time a given scene switch 54 is operated one after the other, a set of scene data corresponding to the operated scene switch is selected to collectively set video processing parameters at each beat position. At the switching to the subsequent scene data, the change time specifying when to change is set in accordance with the current value of the change time dial 59, and the interpolation process is performed in accordance with thus-set change time.

As in the cases of the operations of the reproduction switch 67 shown in FIG. 4(c) through FIG. 4(e), in cases where the timing when a given subsequent scene switch 54 is operated is preceded by a change time, the video signal processing apparatus 1 may be adapted not to perform the interpolation process. Alternatively, the switch timing signal may be provided with a margin to immediately set video processing parameters collectively specified by the subsequent scene data in cases where the timing when a given subsequent scene switch 54 is operated is situated within the margin.

Figure 10:
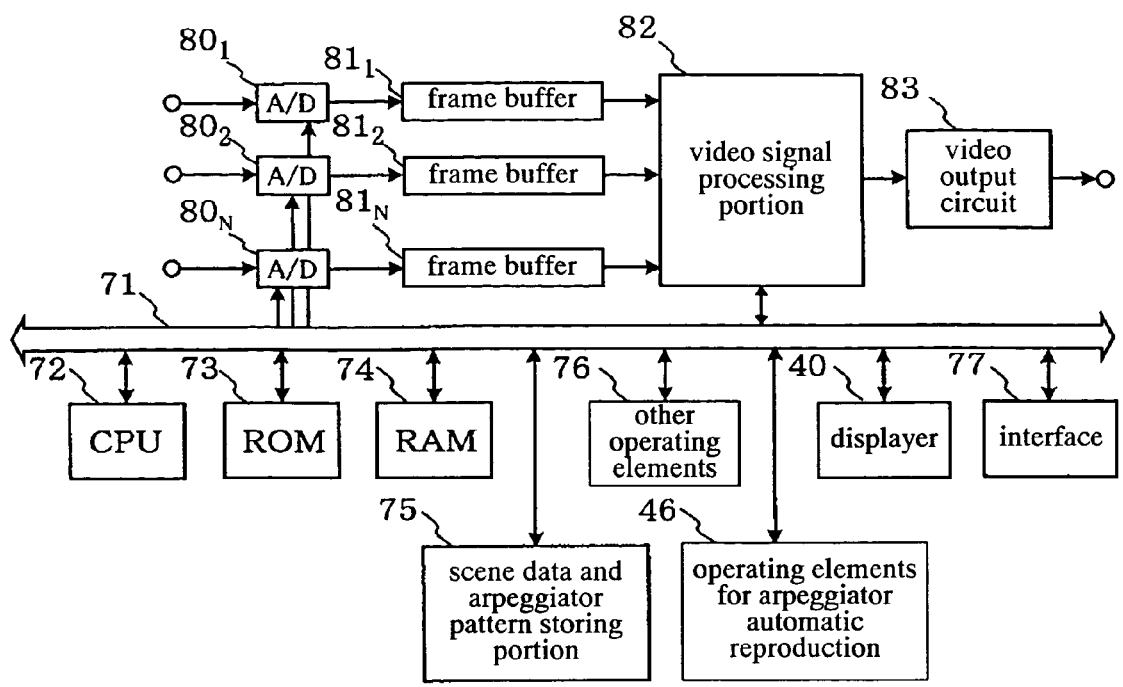
FIG. 10 is a block diagram showing an example of the hardware configuration of the video processing apparatus realizing the functional configuration shown in FIG. 1.

FIG. 10 is a block diagram showing an example of the hardware configuration of the video signal processing apparatus 1 realizing the functional configuration shown in FIG. 1. In FIG. 10, a CPU 72 controls an apparatus having the video signal processing apparatus 1 and the video processing parameter setting apparatus 2 shown in FIG. 1 through the use of control programs and various data stored in a ROM 73. On controlling the apparatus, the CPU 72 uses a RAM 74 as a work area. Through a bus 71 the CPU 72 detects operational events triggered by the various operating elements 46 for the arpeggiator automatic reproduction provided on the operating panel 21 shown in FIG. 5 and FIG. 6 and other operating elements 76. The CPU 72 then sets a plurality of video processing parameters on a video signal processing portion 82 and analog/digital converting portions $80_1$ through $80_N$ to perform video processing such as selection of input channels, switching of input channels between ON and OFF, adjusting image quality, and laying out images. The plurality of video processing parameters can be saved in a scene data and arpeggiator pattern storing portion 75 (e.g., semiconductor memory card such as a flash memory). The video processing parameters can also be read out from the storing portion 75 to load into the RAM 74 of the apparatus. Via an interface 77, a plurality of video processing parameters may be written from an external apparatus into the scene data and arpeggiator pattern storing portion 75.

Numerals $80_1$ through $80_N$ indicate the analog/digital converting portions (digital video decoders), which are connected to the video signal processing portion 82 through frame buffers $81_1$ through $81_N$. The framerate is variably controlled according to parameters for the framerate operated through the channel commonly controlling portion 41 and the switches 42 for specifying the type of video processing parameters. The framerate can also be specified through the real-time scene data or arpeggiator scene data. In addition, the framerate can be adjusted by operating the jog shuttle control 44. The analog/digital converting portions $80_1$ through $80_N$ convert video signals in the form of analog composite signals (video signals, color burst, composite synchronizing signals) into composite signals in the form of digital data. On the conversion, the video signals are divided into luminance signals (Y signals), color-difference signals (Cb signals) and color-difference signals (Cr signals). Since video signals from the input channels 1 through N are not necessarily synchronized, the video signals from the input channels 1 through N are transmitted to the frame buffers $81_1$ through $81_N$ for synchronization between the video signals. The video signals are then output to the video signal processing portion 82.

The video signal processing portion 82 is realized by, for example, a DSP (Digital Signal Processor). The CPU 72 sets the values of video processing parameters including input channels, mixing signal path, etc., while the video signal processing portion 82 mixes the input video signals in real-time. A video output circuit (digital video encoder) 83 produces analog composite signals from YCrCb signals of video signals output from the video signal processing portion 82. The video output circuit 83 then outputs the produced analog composite signals to a video display apparatus such as a video projector which is not shown to display on the video display apparatus with a screen layout in accordance with the output video signals. In the above description, composite signals are applied as input/output signals, however, video signals output from a personal computer to a display apparatus may be converted into the above-described composite video signals and input to the video output circuit 83. Alternatively, digital video signals may be input to the frame buffer 81 directly. In addition, video signals to be input/output are not limited to YCrCb signals but may be any signals as far as they represent the luminance and hue of images such as RGB signals.

To the bus 71 there is connected an interface 77 for connecting with an external apparatus such as a personal computer. The external personal computer is capable of controlling the video signal processing portion 82 in a manner similar to the CPU 72. In this case, the external personal computer is adapted such that the operating elements are displayed on the display screen of the personal computer, being operated with a keyboard and mouse in GUI (graphical user interface). As the interface 77, a MIDI (Musical Instrument Digital Interface) interface may be utilized which has been designed for transmitting musical instrument performance data. The visual mixer shown in FIG. 10 may be connected with another visual mixer via the interface 77 to allow for the visual arpeggiator-related operations including crossfader, real-time scene memory, arpeggiator automatic reproduction mode and operations for dissolve selection on a slave mixer in synchronization with a master mixer.

The control programs can be updated if at least part of the ROM 73 is configured by a flash memory. The control programs may be either downloaded from a server via the interface 77 or installed from a memory card. If a drive used as a recording medium such as an HDD (hard disk drive), CD-ROM (compact disk-read-only memory), MO (magneto optical disk), DVD (digital versatile disk), etc. is connected as an external storage device through the bus 71, the control programs may be also installed on an HDD, CD-ROM, MO, DVD, etc. Moreover, inputting video signals read out from the HDD, CD-ROM, MO, DVD, etc. and writing output video signals on which video signal processing has been performed into the HDD, CD-ROM, MO, DVD, etc. are also possible.

Figure 11:
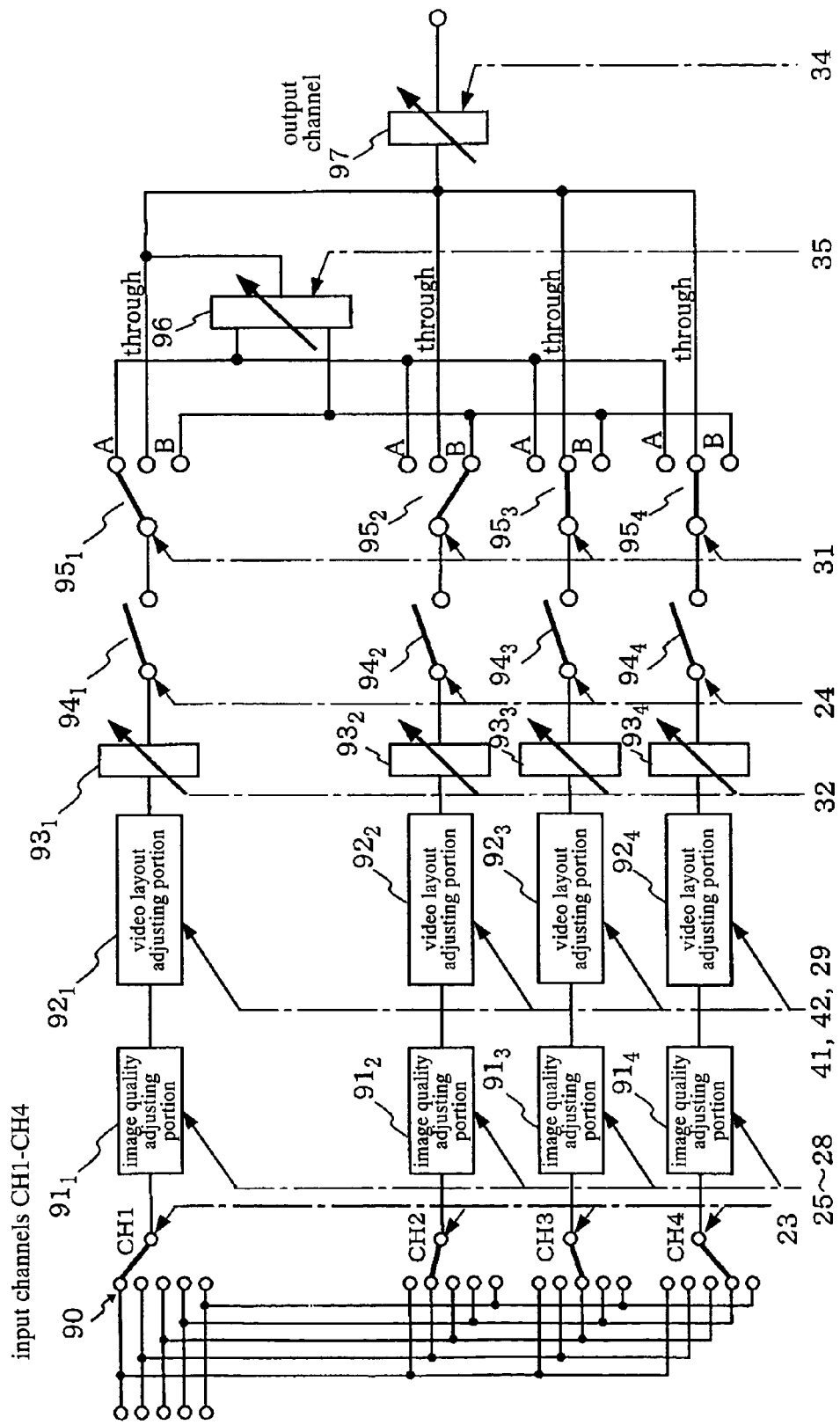
FIG. 11 is a diagram showing a signal path provided for describing a video signal processing apparatus according to the functional configuration shown in FIG. 1.

FIG. 11 is a diagram showing a signal path provided for describing the video signal processing apparatus 1 according to the functional configuration shown in FIG. 1. Components described below represent the functions of the video signal processing apparatus 1 shown in FIG. 1 and the video signal processing portion 82 shown in FIG. 10 in an equivalent circuit. The equivalent circuit is provided with four input channels and one output channel. Numeral 90 indicates an input channel assigning portion, which is controlled in accordance with the video processing parameters specified on the basis of the operations on, for example, the 5-in-1 selectors shown in FIG. 5. Numerals 91₁ through 91₄ indicate image quality adjusting portions, which adjust the image quality of the first through fourth input channels, respectively. The image quality adjusting portions 91₁ through 91₄ are controlled in accordance with the video processing parameters set on the basis of the operations of the positive/negative display selecting switches 25, trim volumes 26, color adjusting volumes 27, color gain volumes 28, etc. shown in FIG. 5.

Numerals 92₁ through 92₄ indicate video layout adjusting portions, which are controlled in accordance with the parameters such as the position of an image (Position), the number into which an image is to be divided (Division), reverse of an image (Reverse: lateral, vertical, both axes), size of image (Size), distortion (Distortion: distortion factor, LFO speed, types of distortion), layer (Layer: availability of layer display), etc. of each input channel, the parameters being set by the channel commonly controlling portion 41 and the switches 42 for specifying the type of a video processing parameter shown in FIG. 5. Numerals 93₁ through 93₄ indicate gain adjusting portions, which are controlled in accordance with the video processing parameters set by the faders 32, etc. shown in FIG. 5. Numerals 94₁ through 94₄ indicate on/off switching portions, which control whether or not to output video signals transmitted through the gain adjusting portions 93₁ through 93₄. The on/off switching portions 94₁ through 94₄ are controlled in accordance with the parameters set on the basis of the switches 24 for determining whether or not to use each channel shown in FIG. 5.

Numerals 95₁ through 95₄ indicate switch portions for selecting an assigned path to a cross gain adjusting portion 96 from the input channels 1 through 4. The switch portions select "input A", "input B" or "Through", being controlled in accordance with video processing parameters set on the basis of operations of the crossfader assigning switches 31, etc. shown in FIG. 5. Connections indicating the input of video signals at the "input A", "input B" and "Through" represent additive synthesis of video signals. Numeral 96 is the cross gain adjusting portion for synthesizing two separate video signals assigned to "input A" and "input B" to which weights varying in the opposite direction are assigned and outputting thus-synthesized signals. The cross gain adjusting portion 96 is controlled in accordance with parameters set on the basis of operations of the crossfader 35 and various switches 36 for setting a crossfading method shown in FIG. 5. Connections between the output of the cross gain adjusting portion 96 and the output from "Through" of each channel represent additive synthesis of video signals.

Numeral 97 indicates a main gain adjusting portion, which is controlled in accordance with video processing parameters set on the basis of operations of output channel fader 34 shown in FIG. 5. The video processing parameters to be set on the basis of operations of the above-described input channel assigning portion 90, image quality adjusting portion 91, video layout adjusting portions 92, gain adjusting portions 93 and on/off switching portions 94 can be also controlled on the basis of video processing parameters collectively specified by the real-time scene data or arpeggiator scene data. In addition, any given video processing parameters may be arbitrarily adjusted by the operation of the jog shuttle control 44.

In the hardware configuration shown in FIG. 10, the video signal processing apparatus 1 and the video processing parameter setting apparatus 2 shown in FIG. 1 are implemented in one video processing apparatus. Alternatively, the video signal processing apparatus 1 and video processing parameter setting apparatus 2 may be configured separately by providing a connecting interface therebetween. Further, the signal-processing functions realized by the video signal processing apparatus 1 shown in FIG. 1 may be accomplished by use of software programs executed by the CPU 72 shown in FIG. 10 or another CPU. Therefore, instead of the purpose-built video processing apparatus, necessary functions can be realized by installing, on a personal computer, software programs realizing the functions of the video processing parameter setting apparatus 2 or the functions of the video processing parameter setting apparatus 2 and video signal processing apparatus 1.

Figure 12:
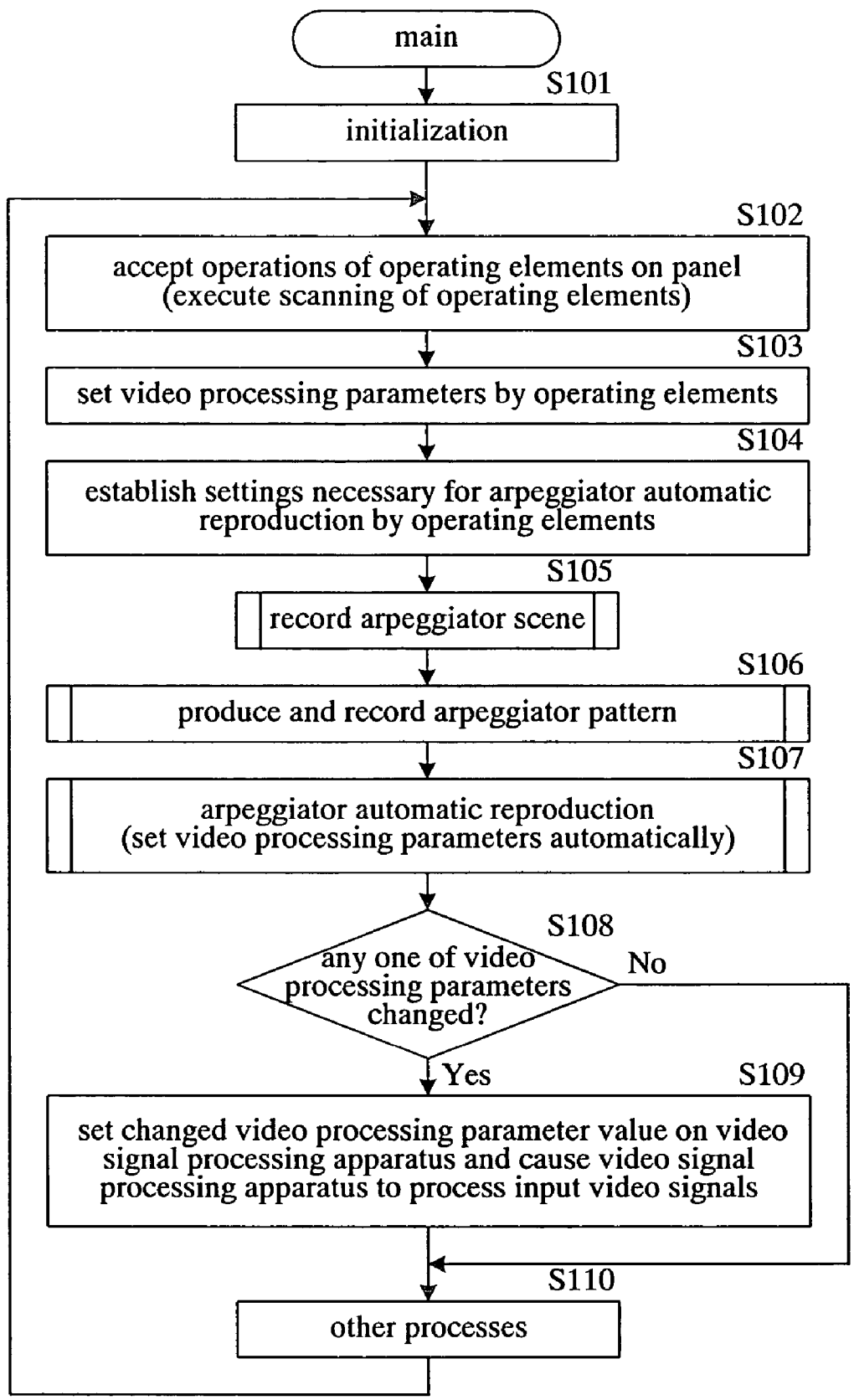
FIG. 12 is a main flowchart illustrating an operating example of an embodiment of the present invention.

FIGS. 12 through 17 are flowcharts illustrating an operating example of an embodiment of the present invention. FIG. 12 is a main flowchart. The description will be given on the basis of this main routine and a time interrupt processing routine shown in FIG. 17, however, the present invention is not limited by these routines. Although the description of the arpeggiator automatic reproduction will be also provided, other processes are omitted in the flowchart. However, descriptions of some processes of the arpeggiator automatic reproduction are omitted for the sake of simplicity.

The main flowchart shown in FIG. 12 is started when the power is turned on. At S101, initialization is conducted, and at S102 there are accepted operations of operating elements provided on the operating panel 21. At S103 values of video processing parameters specified by the operating elements are set, while established at S104 are settings necessary for the arpeggiator automatic reproduction such as the change time, tap tempo, etc. At S105 arpeggiator scenes are recorded, while at S106 there are produced and recorded arpeggiator patterns. At S107 the arpeggiator automatic reproduction is performed to automatically set video processing parameters collectively. At S108 the currently set values of video processing parameters are compared with previous values which were set at the last time this step was processed, to determine whether any one of the video processing parameters has been changed. If so, the flowchart proceeds to step S109 and sets the changed value of the video processing parameter on the video signal processing apparatus 1 to cause the video signal processing apparatus 1 to process input video signals. At S110 other processes are conducted, and the flowchart returns to S102.

Figure 13:
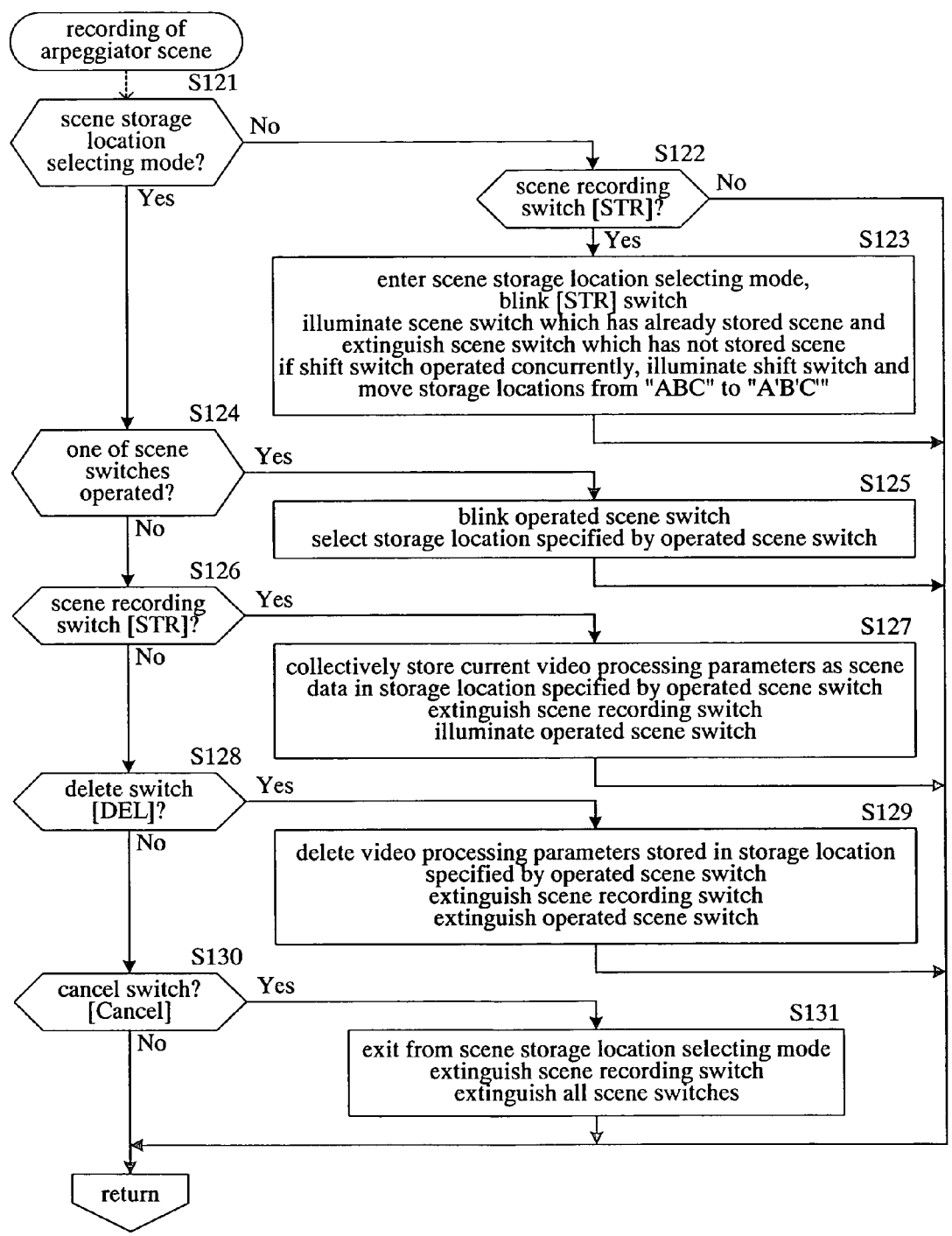
FIG. 13 is a flowchart illustrating the detail of step S105 for recording an arpeggiator scene shown in FIG. 12.

FIG. 13 is a flowchart illustrating the detail of S105 for recording an arpeggiator scene shown in FIG. 12. Descriptions of a step which determines whether or not to enter this flowchart will be omitted. If the condition that the video signal processing apparatus 1 is placed in the arpeggiator mode but has not gone into any other mode such as the arpeggiator pattern storage location selecting mode or the arpeggiator automatic reproduction mode is met, the flowchart proceeds to S121. If the condition is not met, the flowchart returns to the main flowchart shown in FIG. 12. Some of the switches are illuminated type with a built-in light-emitting diode. Although the illumination state of each switch is described in the flowchart, detailed descriptions of the illumination state will be omitted.

At S121 it is determined whether the video signal processing apparatus 1 is placed in the scene storage location selecting mode. If not, the flowchart proceeds to S122 to determine whether the scene recording switch [STR] 56 has been operated. If so, the flowchart proceeds to S123 to put the video signal processing apparatus 1 into the scene storage location selecting mode. If the shift switch [Shift] 55 has been also operated concurrently, the storage locations are moved from "ABC" to "A'B'C'". At S124 it is determined whether one of the scene switches 54 has been operated. If so, the flowchart proceeds to S125 to select a storage location specified by the operated scene switch 54. Although there are cases where a plurality of scene switches 54 are operated consecutively, the last scene switch 54 is adapted to be effective. At S126 it is determined whether the scene recording switch [STR] 56 has been operated. If so, the flowchart proceeds to S127 to collectively store, as a set of scene data, the currently set video processing parameters in a storage location specified by the operated scene switch 54. The storage location is contained in the scene data memory shown in FIG. 7(a).

If the specified storage location has already had another set of scene data, the values of video processing parameters which are contained in the both sets of scene data and assigned to the same input channel may be rewritten by overwriting or addition. On the other hand, the values of video processing parameters which are not contained in the previous set or are assigned to a different channel may be additively recorded. The above-described recording of scene data allows for sophisticated parameter settings. At S128 it is determined whether the delete switch 72 (FIG. 6) has been operated. If so, the flowchart proceeds to S129 to delete the video processing parameters stored in the storage location specified by the operated scene switch 54. At S130 it is determined whether the cancel switch 73 (FIG. 6) has been operated. If so, the flowchart proceeds to S131 to exit from the scene storage location selecting mode.

Figure 14:
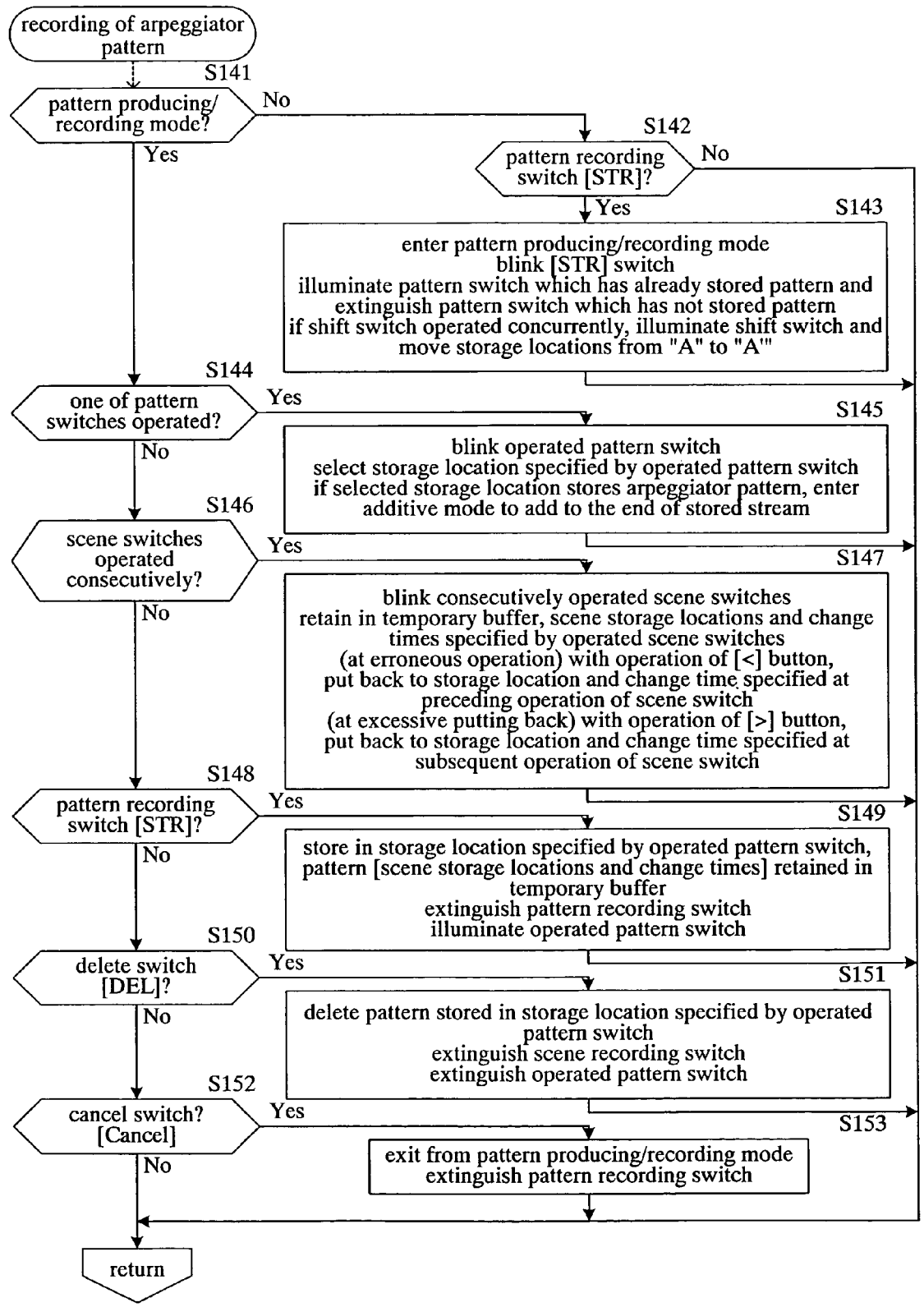
FIG. 14 is a flowchart illustrating the detail of step S106 for recording an arpeggiator pattern shown in FIG. 12.

FIG. 14 is a flowchart illustrating the detail of S106 for recording an arpeggiator pattern shown in FIG. 12. Descriptions of a step which determines whether or not to enter this flowchart will be omitted. If the condition that the video signal processing apparatus 1 is placed in the arpeggiator mode but has not gone into any other mode such as the arpeggiator scene storage location selecting mode or the arpeggiator automatic reproduction mode is met, the flowchart proceeds to S141. If the condition is not met, the flowchart returns to the main flowchart shown in FIG. 12.

At step S141 it is determined whether the video signal processing apparatus 1 is placed in the pattern producing/recording mode. If not, the flowchart proceeds to S142 to determine whether the pattern recording switch [STR] 53 has been operated. If so, the flowchart proceeds to S143 to enter the video signal processing apparatus 1 into the pattern producing/recording mode. At S144 it is determined whether one of pattern switches 51 has been operated. If so, the flowchart proceeds to S145 to select a storage location specified by the operated pattern switch 51. The storage location is contained in the arpeggiator pattern memory shown in FIG. 7(b). If the specified storage location has already had another arpeggiator pattern, the additive recording is conducted as in the case described above. At S146 it is determined whether the scene switches 54 have been operated consecutively. If so, the flowchart proceeds to S147 to retain, in the temporary buffer, the storage locations specified by the consecutively operated scene switches 54 and the values of change times specified by the change time dial 59. However, if the operator has made mistakes during the consecutive operations of the scene switches 54, the values retained in the temporary buffer can be put back by operating the left-pointing switch [<] 70 or right-pointing switch [>] 71.

At S148 it is determined whether the pattern recording switch [STR] 53 has been operated again. If so, the flowchart proceeds to S149 to store, in the storage location specified by the operated pattern switch 51, the pattern containing the scene storage locations and change times retained in the temporary buffer, the storage location being contained in the arpeggiator pattern memory shown in FIG. 7(b). At S150 it is determined whether the delete switch 72 (FIG. 6) has been operated. If so, the flowchart proceeds to S151 to delete the pattern stored in the storage location specified by the operated pattern switch 51. At S152 it is determined whether the cancel switch 73 has been operated. If so, the flowchart proceeds to S153 to exit from the pattern producing/recording mode and return to the main flowchart. In the above-described flowchart, descriptions of the processing conducted in accordance with the operation of the view switch 58 (FIG. 6) have been omitted.

Figure 15:
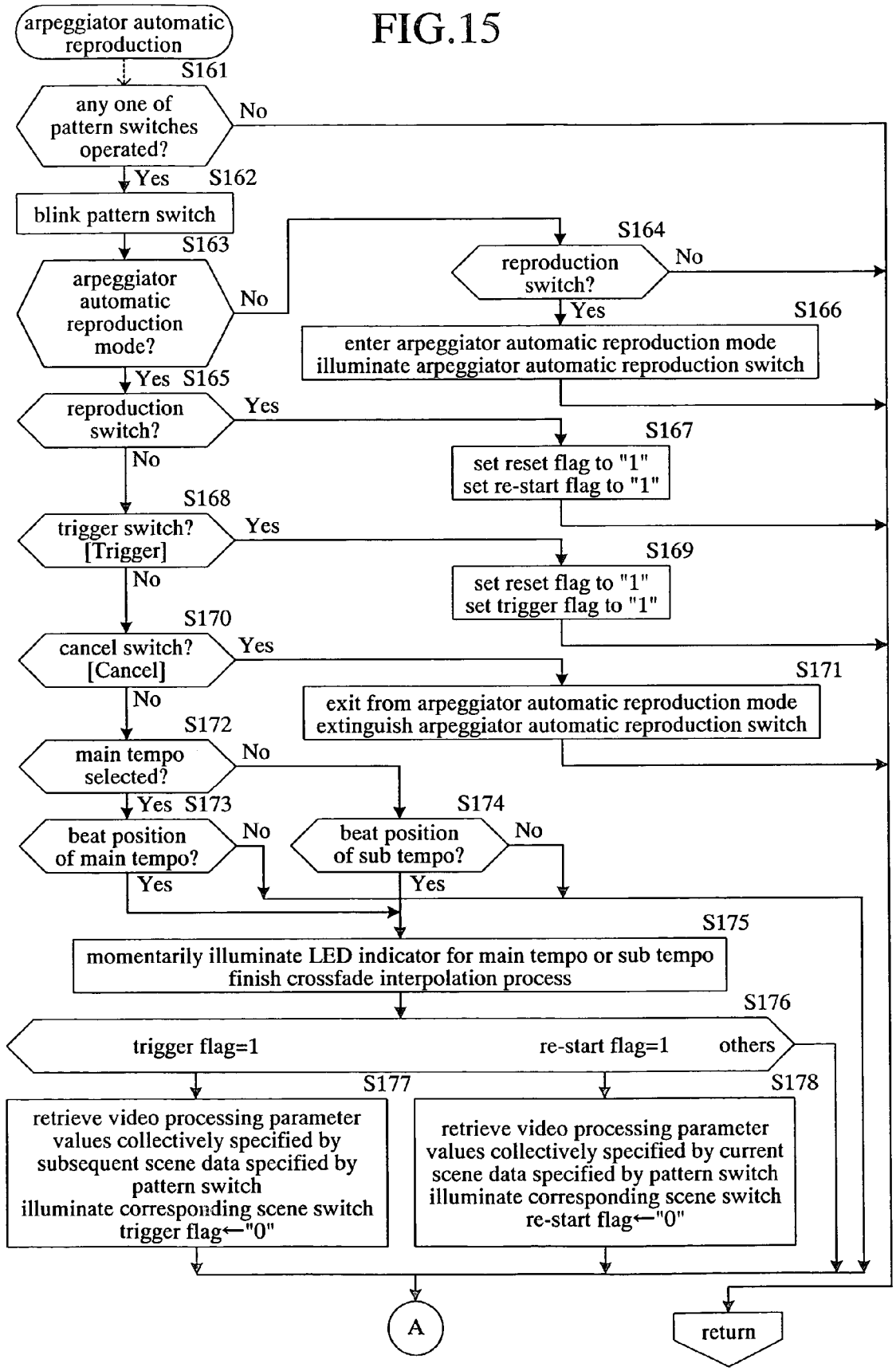
FIG. 15 is a first flowchart illustrating the detail of an arpeggiator automatic reproduction step shown in FIG. 12.

FIG. 15 is a first flowchart illustrating the detail of the step for automatically reproducing an arpeggiator shown in FIG. 12. Descriptions of a step which determines whether or not to enter this flowchart will be omitted. If the condition that the video signal processing apparatus 1 is placed in the arpeggiator mode but has not gone into any other mode such as the arpeggiator scene storage location selecting mode or the arpeggiator pattern storage location selecting mode is met, the flowchart proceeds to S161. If the condition is not met, the flowchart returns to the main flowchart shown in FIG. 12. In this flowchart, descriptions of re-operation of the reproduction switch 67 in the arpeggiator automatic reproduction mode are limited to simple cases such as FIG. 4(d) and FIG. 9(a). Although this flowchart has descriptions of the case where the trigger switch 66 has been operated, descriptions of the cases where the pause switch 68 or the pattern switches 51 have been operated will be omitted.

At S161 it is determined whether any one of the pattern switches 51 has been operated. If so, the flowchart proceeds to S162. If not, the flowchart return to the main flowchart shown in FIG. 12. The pattern switches 51 corresponding to the storage locations in which the arpeggiator pattern is stored have been already illuminated, but at S162 only the operated pattern switch 51 is changed from the illuminated state to the flashing state. At S163 it is determined whether the video signal processing apparatus 1 is in the arpeggiator automatic reproduction mode. If not, the flowchart proceeds to S164 to determine whether the reproduction switch 67 has been operated. If so, the flowchart proceeds to S166 to put the video signal processing apparatus 1 into the arpeggiator automatic reproduction mode.

In the automatic reproduction mode as well, at S165 it is determined whether the reproduction switch 67 has been operated. If so, the flowchart proceeds to S167 to set a reset flag to "1" and a re-start flag to "1". The reset flag in the interrupt processing shown in FIG. 17 causes counted time to be reset to set a beat position. At S168 it is determined whether the trigger switch 66 has been operated. If so, the flowchart proceeds to S169 to set the reset flag to "1" and the trigger flag to "1". At S170 it is determined whether the cancel switch 73 has been operated. If so, the flowchart proceeds to S171 to exit from the arpeggiator automatic reproduction mode.

Figure 16:
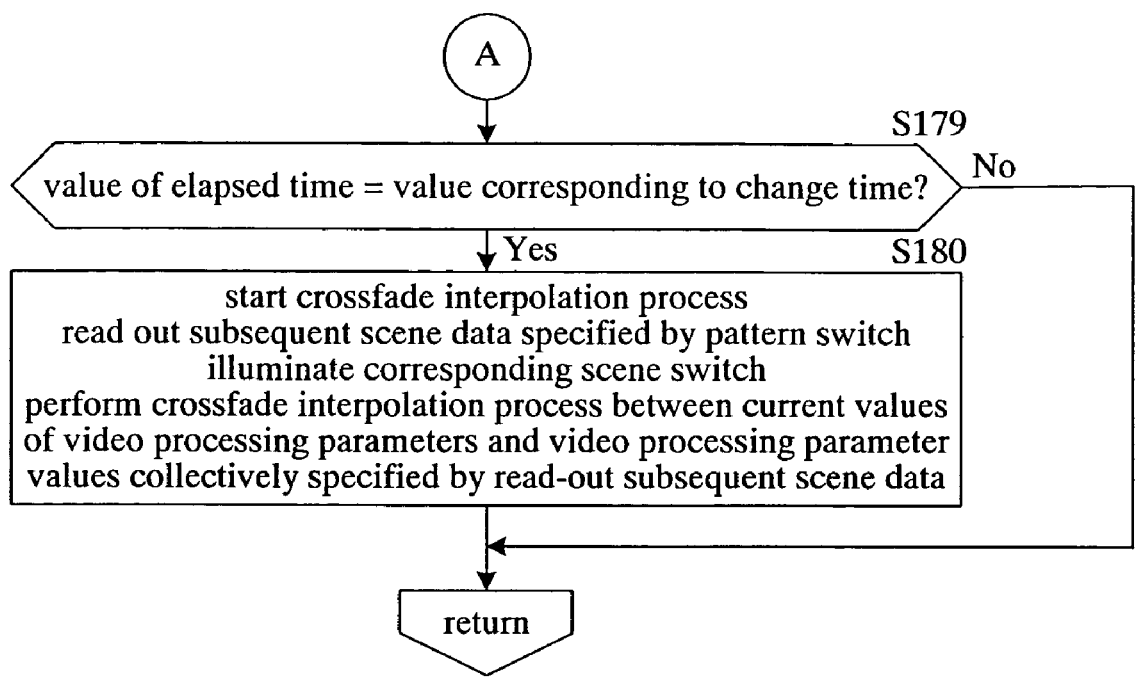
FIG. 16 is a second flowchart illustrating the detail of the arpeggiator automatic reproduction step shown in FIG. 12.

At S172 it is determined whether the main tempo has been selected by operating the dial/tap switch 65. If so, the flowchart proceeds to S173 to determine whether the present time is situated at a beat position of the main tempo. If not, the flowchart proceeds to S174 to determine whether the present time is situated at a beat position of the sub tempo. In either of these two steps, if the present time is situated at a beat position, the flowchart proceeds to S175. If not, the flowchart proceeds to S179 shown in FIG. 16. At S175 the light-emitting diode indicator for the main tempo or sub tempo is illuminated for a very short period of time. More specifically, when the flowchart enters through S173, the light-emitting diode indicator 64 for indicating the main tempo is illuminated. When the flowchart enters through S174, the light-emitting diode indicator 63 for indicating the sub tempo is illuminated. At S175 the crossfade interpolation process started at S180 which is shown in FIG. 16 and will be described later is completed, and the flowchart proceeds to S176. At the completion of the interpolation process, the values of video processing parameters collectively specified by the scene data are set on the video signal processing apparatus 1.

At S176 if the trigger flag is "1" (set at S169), the flowchart proceeds to S177. If the re-start flag is "1" (set at S167), the flowchart proceeds to S178. In other cases, the flowchart proceeds to S179 shown in FIG. 16. At S177 the values of video processing parameters collectively specified by the subsequent scene data specified by the pattern switch 51 (selected at S161) are retrieved. At S177 the trigger flag is then reset to 0, and the flowchart proceeds to S179 shown in FIG. 16. At S178 the values of video processing parameters collectively specified by the current scene data specified by the pattern switch 51 (selected at S161) are retrieved. At S178 the re-start flag is then reset to "0", and the flowchart proceeds to S179 shown in FIG. 16.

FIG. 16 is a second flowchart illustrating the detail of the step for automatically reproducing an arpeggiator shown in FIG. 12. At S179 it is determined whether the value of an elapsed time which will be described later with reference to FIG. 17 has reached the value corresponding to the change time (%). If so, the flowchart proceeds to S180 to start the crossfade interpolation process. More specifically, the subsequent scene data specified by the pattern switch 51 (selected at S161) is read out to retrieve the video processing parameters collectively specified by the scene data as the parameters to be used at the subsequent beat position. Further, the crossfade interpolation process is started for crossfading the current values of the video processing parameters set at the timing corresponding to the change time and the above-described values of video processing parameters to be set at the subsequent beat position. Then, the flowchart returns to the main flowchart shown in FIG. 12.

Figure 17:
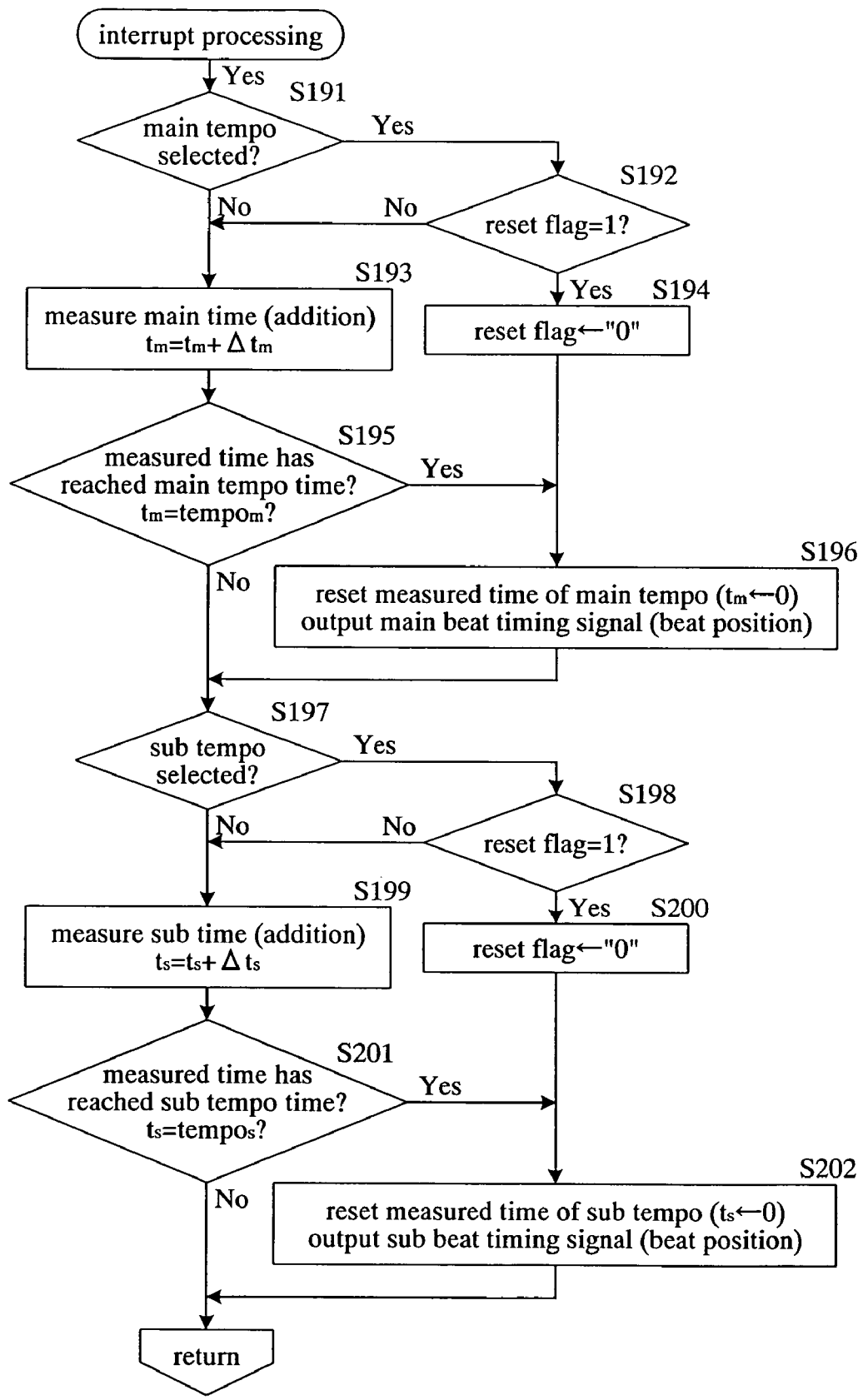
FIG. 17 is a flowchart illustrating an interrupt processing conducted concurrently with the main process shown in FIG. 12.

FIG. 17 is a flowchart illustrating an interrupt processing conducted concurrently with the main process shown in FIG. 12. The interrupt processing is required when the video signal processing apparatus 1 is in the arpeggiator automatic reproduction mode or arpeggiator push'n push mode. At S191 it is determined whether the main tempo is the current selection. This determination is done by detecting the operational state of the dial/tap switch 65. If the main tempo is the current selection, the flowchart proceeds to S192. If not, the flowchart proceeds to S193. At S192 it is determined whether the reset flag is "1". If not, the flowchart proceeds to S193. If so, the flowchart proceeds to S194 to put the reset flag back to "0" and proceeds to S196. At S193 the main time ($t_m$) is measured. That is, $\Delta t_m$ is added to $t_m$. At S195 it is determined whether the measured time has reached a cycle of the main tempo (tempo$_m$) set by the tempo tap switch 63. If so, the flowchart proceeds to S196 and resets the measured time of the main tempo ($t_m \leftarrow 0$) to output a beat timing signal for the main tempo (indicative of a beat position of the main tempo).

The following steps of S197 through S202 are performed in a manner similar to the above-described steps. At S199 the sub time ($t_s$) is measured. If the measured time has reached a cycle of the sub tempo (tempo$_s$) set by the tempo tap switch 63 and the tempo dial 61, or if the reset flag has been put back to "0" at S200, the measured time of the sub tempo is reset ($t_s \leftarrow 0$) to output a beat timing signal of the sub tempo (indicative of a beat position of the sub tempo) at S202. As described above, the main tempo and the sub tempo are provided separately. At every interrupt processing, therefore, the time measurement is conducted for the both tempos in parallel. The measured time of the selected tempo is reset by the reset flag (set at S167 or S169 in FIG. 15) to output a beat timing signal.

In the above-described FIGS. 15 through 17, if the reproduction switch 67 has been operated, the steps of S163-S164-S166-[return] causes the video signal processing apparatus 1 to go into the automatic reproduction mode. Then, if the measured time has reached the timing corresponding to the change time, the flowchart proceeds the steps from S163- . . . -S179-S180 to read out the first scene data "$a_1$" to collectively specify the video processing parameters. On the basis of thus-specified video processing parameters, the values of the video processing parameters to be set at the subsequent beat position are retrieved. The crossfade interpolation process is performed between thus-retrieved values of the video processing parameters and the current values of the corresponding video processing parameters. Then, if the subsequent time measurement results in a beat position (e.g., a beat position for the main tempo), the flowchart follows the steps from S163- . . . -S172-S173-S175 to complete the interpolation process. At the time of the completion, the values of the video processing parameters collectively specified by the scene data read out at S180 to be set at the beat position are set on the video signal processing apparatus 1 at S109 of FIG. 12.

Further, in the automatic reproduction mode, if the reproduction switch 67 has been operated again at the timing shown in FIG. 9(a), the flowchart follows the steps of S165-S167-[return] to set the reset flag to "1". At S194 of FIG. 17 the reset flag is put back to "0", and at S196 a beat timing signal is output to set a beat position. Further, the re-start flag is set to "1". Then, the flowchart follows the steps of S172-S173-S175-S176-S178 to retrieve the values of video processing parameters collectively specified by the current scene data "$b_1$" to set the retrieved values on the video signal processing apparatus 1 at S109 of FIG. 12. In the automatic reproduction mode, if the operation of the trigger switch 66 is detected at the timing shown in FIG. 9(e), the flowchart follows the steps of S168-S169-[return] to set the reset flag at 1. At S196 of FIG. 17 a beat timing signal is output to set a beat position, and the trigger flag is set at 1. Then, the flowchart follows the steps of S172-S173-S175-S176-S177 to retrieve the values of video processing parameters collectively specified by the subsequent scene data "$c_1$" to set the retrieved values on the video signal processing apparatus 1 at S109 of FIG. 12.

If the operation of the pause switch 68 is detected, which is not shown, the trigger flag is kept at "0" not to start the crossfade interpolation process of S180 at a change time. When the pause switch 68 is operated again to cancel the pause, the crossfade interpolation process may be performed at S180. If the operation of the reverse switch 69 is detected, which is not shown, the trigger flag is kept at "0" not to start the crossfade interpolation process of S180 at a change time. In this case, at a beat position the step S178 is replaced by a step in which the values of video processing parameters collectively specified by the first scene data "$a_1$" specified by the current pattern switch 51 are retrieved to be set on the video signal processing apparatus 1 at S109 of FIG. 12. If the operation of the pattern switch 54 is detected, which is not shown as well, performed is processing similar to the above case of the reverse switch 69. More specifically, at a beat position the step S178 is replaced by a step in which the values of video processing parameters collectively specified by the first scene data "$a_2$" of the arpeggiator pattern (2) specified by the detected pattern switch 54 are retrieved.

In the above descriptions of the first operation of the reproduction switch 67 there are omitted cases such as FIG. 4(c) and FIG. 4 (e) in which varied processing is required according to the correspondence between the operational timing, beat position and change time. However, the processing may be performed such that the correspondence is detected to follow appropriate steps. Similarly, although various processing is required at operations of other switches according to the correspondence between the operational timing, beat position and change time, the processing may be performed such that the correspondence is detected to follow appropriate steps.

In the above descriptions, video signals are input and processed in real time to output in real time, however, the present invention may be applied to cases where video signals recorded in data file are processed, and the processed video signals are stored again in a file or reproduced in real time.

What is claimed is:

1. A video processing parameter setting apparatus for setting values of a plurality of parameters on a video signal processing apparatus which inputs a video signal, processes the video signal in accordance with the values of the plurality of parameters and outputs the processed video signal, said video processing parameter setting apparatus comprising:

a switch timing outputting portion for periodically outputting a switch timing signal in accordance with a cycle that is set by a user;

a parameter value collectively specifying portion for collectively specifying values of the plurality of parameters by periodically and sequentially selecting a set of scene data from amongst a plurality of sets of scene data in accordance with a predetermined order, each set of scene data including a plurality of parameters to be set on the video signal processing apparatus; and a changing process portion for changing, in a given length of time and each time the switch timing outputting portion outputs the switch timing signal, the values of the parameters set on said video signal processing apparatus from currently set values into the values of the parameters included in a set of scene data selected by said parameter value collectively specifying portion.

2. A video processing parameter setting apparatus according to claim 1, wherein said parameter value collectively specifying portion is capable of collectively specifying values of the plurality of parameters included in two or more sets of scene data by selecting the two or more sets of scene data sequentially from among the plural sets of scene data.

3. A video processing parameter setting apparatus according to claim 1, wherein the values of the parameter specify the size or layout of a video image.

4. A video processing parameter setting apparatus according to claim 1,
wherein said changing process portion specifies a timing of starting changing within the cycle period, starts the changing of the values of parameters set on the video signal processing apparatus at the specified timing of the starting changing and finishes the changing of the values of parameters prior to a subsequent switch timing at which the switch timing outputting portion will output the switch timing signal subsequently.

5. A video processing parameter setting apparatus for setting values of a plurality of parameters on a video signal processing apparatus which inputs a video signal, processes the video signal in accordance with the values of the plurality of parameters and outputs the processed video signal, said video processing parameter setting apparatus comprising:

a switch;

a parameter value collectively specifying portion that is driven upon user operation of the switch, and collectively specifies values of the plurality of parameters as scene data;

a switch timing outputting portion for periodically outputting a switch timing signal in accordance with a cycle period that is set; and a changing process portion for specifying a timing of starting changing in between adjacent switch timing signals output by said switch timing outputting portion, wherein in a first case where a timing at which the user operates the switch to drive the parameter value collectively specifying portion precedes the timing of starting changing within the cycle period, said changing process portion starts, at the timing of starting changing, changing of values of the parameters set on said video signal processing apparatus from values set at the timing of starting changing into the values of the parameters collectively specified by said parameter value collectively specifying portion, and finishes the changing of the values of the parameters at a subsequent switch timing which the switch timing outputting portion will subsequently output the switch timing signal, and wherein in a second case where the timing at which said parameter value collectively specifying portion collectively specifies the values of the parameters follows the timing of starting changing and precedes a subsequent switch timing, said changing process portion changes at the subsequent switch timing, the values of parameters set on said video signal processing apparatus into the values of the parameters collectively specified by said parameter value collectively specifying portion.

6. A video processing parameter setting apparatus according to claim 5, wherein the switch timing signal output by said switch timing outputting portion has a given margin; and wherein in a third case where a timing at which the user performs the predetermined operation to drive the parameter value collectively specifying portion is placed in the marginal period, said changing process portion changes at the timing which the user performs the predetermined operation, the values of the parameters set on said video signal processing apparatus into the values of the parameter collectively specified by said parameter value collectively specifying portion.

7. A video processing parameter setting apparatus for setting values of a plurality of parameters on a video signal processing apparatus which inputs a video signal, processes the video signal in accordance with the values of the plurality of parameters and outputs the processed video signal, said video processing parameter setting apparatus comprising:

a parameter value collectively specifying portion for collectively specifying values of the plurality of parameters as scene data;

a switch timing outputting portion for periodically outputting a switch timing signal in accordance with a cycle period that is set by a user; and a changing process portion for changing, at a first switch timing at which the switch timing outputting portion outputs the switch timing signal, the values of the parameters set on said video signal processing apparatus into the values of the parameters collectively specified by said parameter value collectively specifying portion;

specifying a timing of starting changing in between the first switch timing and a second switch timing at which the switch timing outputting portion outputs the switch timing signal subsequently; and changing, from the specified timing of starting changing to the second switch timing, the values of the parameters set on the video signal processing apparatus from the values set at the specified timing of starting changing into the values of the parameters which had been set on the video signal processing apparatus prior to said first switch timing.

8. A video processing parameter setting apparatus for setting values of a plurality of parameters on a video signal processing apparatus which inputs a video signal, processes the video signal in accordance with the values of the plurality of parameters and outputs the processed video signal, said video processing parameter setting apparatus comprising:

a switch timing outputting portion for periodically outputting a switch timing signal in accordance with a cycle period that is set by a user;

a parameter value collectively specifying portion for collectively specifying values of the plurality of parameters by periodically and sequentially selecting a set of scene data from among a plurality of sets of scene data in accordance with a predetermined order, each set of scene data including a plurality of parameters to be set on the video signal processing apparatus; and a changing process portion for changing, every time the switch timing outputting portion outputs the switch timing signal, the values of the parameters set on said video signal processing apparatus into the values of the parameters included in a set of scene data selected by said parameter value collectively specifying portion.

9. A video processing parameter setting apparatus according to claim 8, wherein said parameter value collectively specifying portion is capable of collectively specifying values of the plurality of parameters included in two or more sets of scene data by selecting the two or more sets of scene data sequentially from among the plural sets of scene data.

10. A video processing parameter setting apparatus according to claim 8, wherein the values of the parameter specify the size or layout of a video image.

11. A video processing parameter setting apparatus according to claim 8 further comprising:

a mode selecting portion for selecting one from among a plurality of switching timing modes, wherein said switch timing outputting portion is capable of outputting the switch timing signal in the plurality of switching timing modes whose cycle period can be set individually, and outputs the switch timing signal in a switching timing mode selected by said mode selecting portion.

12. A video processing parameter setting apparatus according to claim 11, wherein the cycle period of the switch timing signal for a sub mode relative to the cycle period of the switch timing signal for a main mode can be set in said switch timing outputting portion.

13. A video processing parameter setting apparatus according to claim 12, wherein said switch timing outputting portion resets a phase of switch timing signal for the sub mode and outputs the switch timing signal for the sub mode when the switch timing is changed from the main mode to the sub mode.

14. A video processing parameter setting apparatus according to claim 12, wherein said switch timing outputting portion outputs the switch timing, signal of the main mode without resetting a phase of the main switch timing signal when the switch timing is changed from the sub mode to the main mode.

15. A video processing parameter setting apparatus according to claim 8,
wherein said parameter value collectively specifying portion selects either one of a first mode and a second mode, and
wherein said switching timing outputting portion resets a phase of the switch timing signal and outputs the switch timing signal in the first mode and does not reset the phase of the switch timing signal in the second mode.

16. A video processing parameter setting apparatus for setting values of a plurality of parameters on a video signal processing apparatus which inputs a video signal, processes said video signal in accordance with the values of the plurality of parameters and outputs the processed video signal, said video processing parameter setting apparatus comprising:
a switch timing outputting portion for periodically outputting a switch timing signal in accordance with a cycle period that is set by a user;
a parameter value collectively specifying portion for collectively specifying values of the plurality of parameters by periodically and sequentially selecting a set of scene data from amongst a plurality of sets of scene data, each set of scene data including a plurality of parameters to be set on the video signal processin a aratus; and
a changing process portion for changing, every time the switch timing outputting portion outputs the switch timing signal, the values of the parameters set on said video signal processing apparatus from currently set values into the values of the parameters included in a set of scene data to be selected subsequently by said parameter value collectively specifying portion.

17. A video processing parameter setting apparatus according to claim 16, wherein the values of the parameter specify the size or layout of a video image.

18. A video processing parameter setting apparatus according to claim 16, wherein said parameter value collectively specifying portion selects the set of scene data from amongst the plural sets of scene data in a predetermined order.

19. A video processing parameter setting apparatus according to claim 18, wherein said parameter value collectively specifying portion selects a first scene data from among the plural sets of scene data after selecting a last scene data from among the plural sets of scene data.

20. A video processing parameter setting apparatus according to claim 16, wherein said changing process portion changes in a given length of time, the values of the parameters set on said video signal processing apparatus.

21. A video processing parameter setting apparatus according to claim 18, wherein the predetermined order is set by a user in advance and editable by the user thereafter.

22. A video processing parameter setting apparatus according to claim 18, wherein
said parameter value collectively specifying portion has a storage for storing the plural sets of scene data in a predetermined order and timings of start changing the values of the parameters in associated relation with the order.

23. A video processing parameter setting apparatus for setting values of a plurality of parameters on a video signal processing apparatus which inputs a video signal, processes the video signal in accordance with the values of the plurality of parameters and outputs the processed video signal, said video processing parameter setting apparatus comprising:
a switch timing outputting portion for periodically outputting a switch timing signal in accordance with a cycle period that is set by a user;
a parameter value collectively specifying portion for collectively specifying values of the plurality of parameters by periodically and sequentially selecting a set of scene data from among a plurality sets of scene data in accordance with a predetermined order, each set of scene data including a plurality of parameters to be set on the video signal processing apparatus;
a changing process portion for changing, every time the switch timing outputting portion outputs the switch timing signal, the values of the parameters set on said video signal processing apparatus into the values of the parameters included in a set of scene data to be selected subsequently by the parameter value collectively specifying portion; and
a switch,
wherein when the switch is operated by a user while the parameter value collectively specifying portion is collectively specifying values of the plurality of parameters included in a set of first scene data, said switch timing outputting portion resets, in response to the user's operation, a phase of the switch timing signal and simultaneously outputs the switch timing signal, and said changing process portion sets the video signal processing apparatus into the values of the plurality of parameters included in the set of the first scene data again in response to the switch timing signal which is output simultaneously or changes the values of the parameters set on said video signal processing apparatus into values of the parameters included in a set of second scene data different from the first scene data in response to the switch timing signal that is output simultaneously.

24. A video processing parameter setting apparatus according to claim 23, wherein said changing process portion specifies a timing of starting changing within the cycle period, starts the changing of the values of parameters set on the video signal processing apparatus at the specified timing of the starting changing, and finishes the changing of the values of parameters at a subsequent switch timing at which the switch timing outputting portion will output the switch timing signal subsequently.

25. A computer-readable medium containing a program for setting values of a plurality of parameters on a video signal processing apparatus which inputs a video signal, processes the video signal in accordance with the values of the plurality of parameters and outputs the processed video signal, said program causing a computer to execute the steps of:
a switch timing outputting step for periodically outputting a switch timing signal in accordance with a cycle which is set by a user;
a parameter value collectively specifying step for collectively specifying values of the plurality of parameters by periodically and sequentially selecting a set of scene data from among a plurality of sets of scene data in accordance with a predetermined order, each set of scene data including a plurality of parameters to be set on the video signal processing apparatus; and a changing process step for changing in a given length of time, the values of the parameters set on said video signal processing apparatus from currently set values into the values of the parameters included in a set of scene data selected by said parameter value collectively specifying step, each time the switch timing outputting step outputs the switch timing signal.

26. A computer-readable medium containing a program for setting values of a plurality of parameters on a video signal processing apparatus which inputs a video signal, processes the video signal in accordance with the values of the plurality of parameters and outputs the processed video signal, said program causing a computer to execute the steps of:

a switch;

a parameter value collectively specifying step that is initiated upon user operation of the switch and collectively specifies values of the plurality of parameters as scene data;

a switch timing outputting step for periodically outputting a switch timing signal in accordance with a cycle period which is set; and a changing process step for specifying a timing of starting changing between adjacent switch timing signals output caused by said switch timing outputting step, wherein in a first case where a timing at which the user operates the switch to initiate the parameter value collectively specifying step precedes the timing of starting changing within the cycle period, said changing process step starts, at the timing of starting changing, changing of values of the parameters set on said video signal processing apparatus from values set at the timing of starting changing into the values of the parameters collectively specified by said parameter value collectively specifying step, and finishes the changing of the values of the parameters at a subsequent switch timing which the switch timing outputting step will subsequently output the switch timing signal, and wherein in a second case where the timing at which said parameter value collectively specifying step collectively specifies the values of the parameters follows the timing of starting changing and precedes a subsequent switch timing, said changing process step changes at the subsequent switch timing, the values of parameters set on said video signal processing apparatus into the values of the parameters collectively specified by said parameter value collectively specifying step.

27. A computer-readable medium containing a program for setting values of a plurality of parameters on a video signal processing apparatus which inputs a video signal, processes the video signal in accordance with the values of the plurality of parameters and outputs the processed video signal, said program causing a computer to execute the steps of:

a parameter value collectively specifying step for collectively specifying values of the plurality of parameters as scene data;

a switch timing outputting step for periodically outputting a switch timing signal in accordance with a cycle period that is set by a user; and a changing process step for changing, at a first switch timing at which the switch timing outputting step causes the outputs of the switch timing signal, the values of the parameters set on said video signal processing apparatus into the values of the parameters collectively specified by said parameter value collectively specifying step;

specifying a timing of change in between the first switch timing and a second switch timing at which the switch timing outputting step causes the output of the switch timing signal subsequently; and changing, from the specified timing of change to the second switch timing, the values of the parameters set on the video signal processing apparatus from the values set at thespecified timing of change into the values of the parameters which had been set on the video signal processing apparatus prior to said first switch timing.

28. A computer-readable medium containing a program for setting values of a plurality of parameters on a video signal processing apparatus which inputs a video signal, processes the video signal in accordance with the values of the plurality of parameters and outputs the processed video signal, said program causing a computer to execute the steps of:

a switch timing outputting step for periodically outputting a switch timing signal in accordance with a cycle period that is set by a user;

a parameter value collectively specifying step for collectively specifying values of the plurality of parameters by periodically and sequentially selecting a set of scene data from among a plurality of sets of scene data in accordance with a predetermined order, each set of scene data including a plurality of parameters to be set on the video signal processing apparatus; and a changing process step for changing, every time switch timing signal is outputted, the values of the parameters set on said video signal processing apparatus into the values of the parameters included in a set of scene data to be selected subsequently by said parameter value collectively specifying step.

29. A computer-readable medium containing a program for setting values of a plurality of parameters on a video signal processing apparatus which inputs a video signal, processes said video signal in accordance with the values of the plurality of parameters and outputs the processed video signal, said program causing a computer to execute the steps of:

a switch timing outputting step for periodically outputting a switch timing signal in accordance with a cycle period that is set by a user;

a parameter value collectively specifying step for collectively specifying values of the plurality of parameters by periodically and sequentially selecting a set of scene data from among a plurality of sets of scene data, each set of scene data including a plurality of parameters to be set on the video signal processing apparatus; and a changing process step for changing, every time the switch timing signal is outputted, the values of the parameters set on said video signal processing apparatus from currently set values into the values of the parameters included in a set of scene data to be selected subsequently by said parameter value collectively specifying step.

30. A computer-readable medium containing a program for setting values of a plurality of parameters on a video signal processing apparatus which inputs a video signal, processes the video signal in accordance with the values of the plurality of parameters and outputs the processed video signal, said video signal processing apparatus having a switch, said program causing a computer to execute the steps of:

- a switch timing outputting step for periodically outputting a switch timing signal in accordance with a cycle period that is set by a user;
- a parameter value collectively specifying step for collectively specifying values of the plurality of parameters by periodically and sequentially selecting a set of scene data from among a plurality sets of scene data in accordance with a predetermined order, each set of scene data including a plurality of parameters to be set on the video signal processing apparatus; and
- a changing process step for changing, every time the switch timing signal is outputted, the values of the parameters set on said video signal processing apparatus into the values of the parameters included in a set of scene data to be selected subsequently by the parameter value collectively specifying step, wherein when the switch is operated by a user while the parameter value collectively specifying step is collectively specifying values of the plurality of parameters included in a set of first scene data, said switch timing outputting step resets, in response to the user's operation, a phase of the switch timing signal and simultaneously outputs the switch timing signal, and said changing process step sets the video signal processing apparatus into the values of the plurality of parameters included in the set of the first scene data again in response to the switch timing signal which is output simultaneously or changes the values of the parameters set on said video signal processing apparatus into values of the parameters included in a set of second scene data different from the first scene data in response to the switch timing signal that is output simultaneously.

* * * * *